United States Patent [19]
Kanerva et al.

[11] Patent Number: 6,026,416
[45] Date of Patent: Feb. 15, 2000

[54] SYSTEM AND METHOD FOR STORING, VIEWING, EDITING, AND PROCESSING ORDERED SECTIONS HAVING DIFFERENT FILE FORMATS

[75] Inventors: Heikki J. Kanerva; Srinivasa R. Koppolu, both of Redmond; Richard J. Wolf; Robert Marcus Girling, both of Seattle, all of Wash.

[73] Assignee: MicroSoft Corp., Redmond, Wash.

[21] Appl. No.: 08/657,644

[22] Filed: May 30, 1996

[51] Int. Cl.⁷ .................................................... G06F 17/21
[52] U.S. Cl. ............................................ 707/515; 707/530
[58] Field of Search ........................... 707/530, 514–516, 707/502

[56] References Cited

U.S. PATENT DOCUMENTS

| | | | |
|---|---|---|---|
| 5,051,930 | 9/1991 | Kuwabara et al. | 707/516 |
| 5,142,618 | 8/1992 | Fujiwara et al. | 707/516 |
| 5,404,435 | 4/1995 | Rosenbaum | 707/515 |
| 5,420,974 | 5/1995 | Morris et al. | 707/515 |
| 5,499,333 | 3/1996 | Doudnikoff et al. | 707/515 |
| 5,537,526 | 7/1996 | Anderson et al. | 707/515 |
| 5,584,035 | 12/1996 | Duggan et al. | 707/516 |
| 5,640,579 | 6/1997 | Koppolu et al. | 395/788 |
| 5,664,178 | 9/1997 | Sinofsky | 707/100 |
| 5,664,208 | 9/1997 | Pavley et al. | 707/515 |

OTHER PUBLICATIONS

Novell, WordPerfect User's Guide, pp. 108–111, 334–339, 1994.

Staff, Claris Package Links Standard Desktop Apps., Computing Canada, v. 19, n. 1, p. 37, Jan. 4, 1993.

Staff, ClarisWorks for Windows, P.C. Letter, v.9, n.4, p.1, Feb. 15, 1993.

Primary Examiner—Joseph H. Feild
Attorney, Agent, or Firm—Jones & Askew, LLP

[57] ABSTRACT

Ordered binder document sections having different file formats stored within a binder file. The binder file maintains the order of binder document sections and the native file format of each section. The ordered sections can be viewed and edited through a viewport of a frame displayed by a binder program module. By selecting graphical images displayed in a selection area of the frame the content of a binder document section can be viewed and edited without viewing the content of other binder document sections. The graphical images can be icons or graphical images derived from the content of sections called thumbnail images. A thumbnail image can be derived from either the first page or from multiple pages of an individual section. The binder program module can also dispatch the underlying application program modules that created each binder document section to print, spell check, and grammar check the binder document sections as a single data processing task. In this manner, selected sections of a binder document can be printed as a single consecutively printed document without having other print jobs interrupting or intervening between printed sections of the binder document.

23 Claims, 16 Drawing Sheets

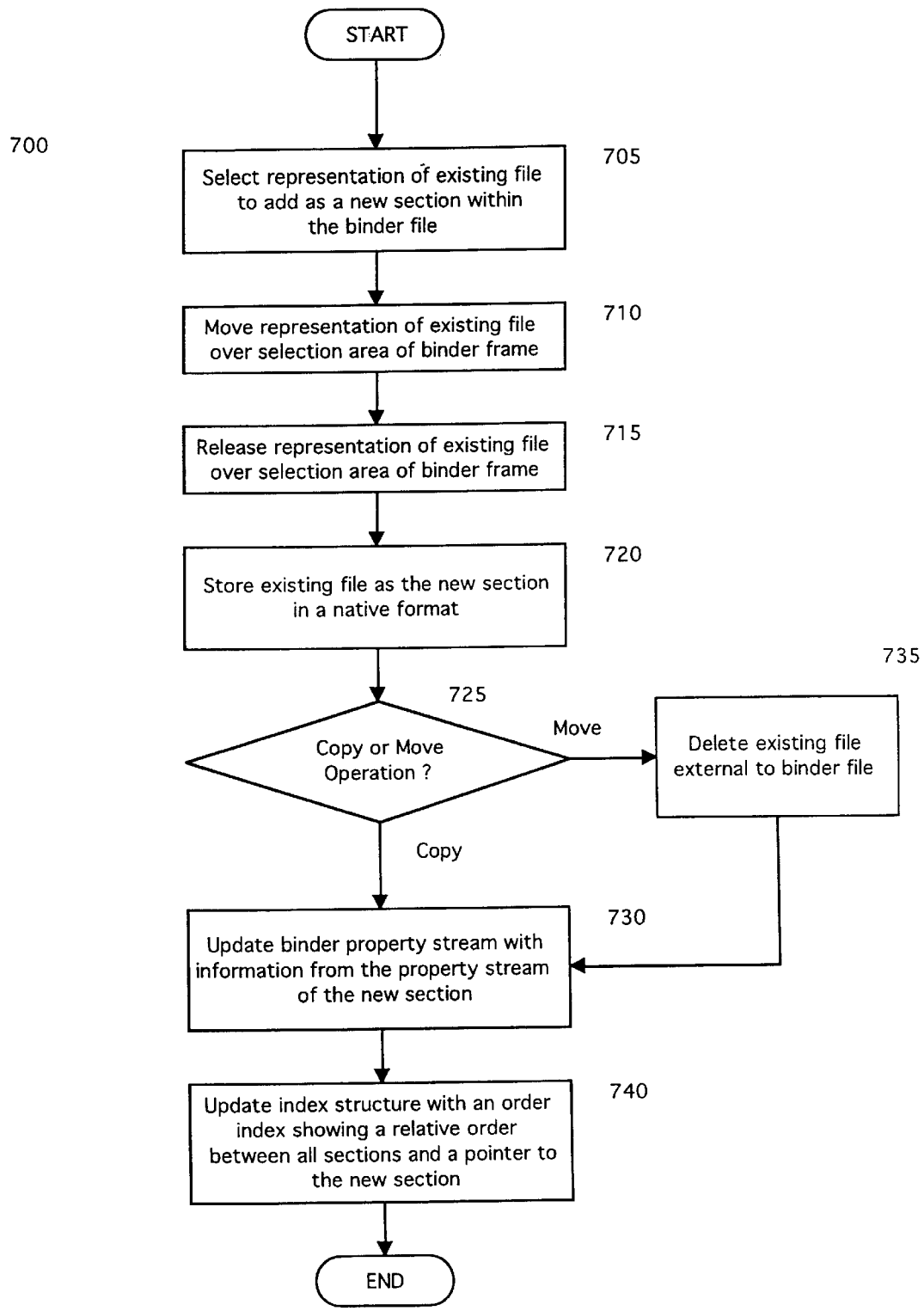

6,026,416

SYSTEM AND METHOD FOR STORING, VIEWING, EDITING, AND PROCESSING ORDERED SECTIONS HAVING DIFFERENT FILE FORMATS

TECHNICAL FIELD

This invention relates to sections of a compound document, and is more particularly related to a system and method for storing, viewing, editing, and processing ordered sections having different file formats.

BACKGROUND OF THE INVENTION

Binding separate paper documents together can create a well organized, coherent collection of information. The separate documents become sections of the bound collection. Binding sections together is the reason traditional three-ring paper binders were created. Multiple sections can be kept in a particular order that makes sense to the one binding the sections together. Different kinds of sections, such as drawings, photographs, and text, can be bound together and labeled with consecutively numbered pages. The bound collection becomes one physical entity that can be maintained and carried around as a single binder. However, the advantages of binding document sections together in the paper world do not easily translate into a computerized environment for electronic documents.

In the electronic documents environment, there are several methods of "binding" electronic document files or sections together. First, document files can be organized or "bound" together in a directory. However, the document files are stored separately. not as a single file, making it more cumbersome to copy or to electronically mail the documents files. Additionally, the files within the directory cannot be maintained in a user-definable order nor can the directory itself be transferred (e.g., copied or electronically mailed) as a single file.

Microsoft Corporation's Word 6.0 word processing application program is capable of binding sections of a compound document in what is called a master document. Sub-documents contain data that is used in the master document. The master document reflects the status of each sub-document that is part of the master document. However, the master document cannot store the sub-documents as part of a single file (master document) nor is the native format for a document maintained once the document is saved as a sub-document of the master document. Furthermore, the master document cannot store sub-documents of differing file formats.

Microsoft Corporation's Excel 5.0 spreadsheet application program is also capable of binding sections of a compound document in what is called a workbook document. The workbook document contains multiple spreadsheets within a single file in a predetermined order. However, the native format for each spreadsheet is not maintained in the workbook document. Furthermore, the workbook document is not capable of storing sections of differing file formats, i.e., only spreadsheets can be sections of the workbook document.

Sections of a compound document can be stored as sub-files of a single compound document file, also known as a file bundle. The data within each sub-file is maintained in the native format defined by the application program module that generated each sub-file. The compound document file maintains the sub-files and a directory of pointers. The pointers indicate the physical location in memory of each sub-file within the compound document file. However, the order of sub-files is not maintained within the compound document file.

Another method of "binding" electronic documents together is by embedding information from document files into a compound document. This compound document concept is well known and is implemented by the Object Linking and Embedding (OLE) 2.0 protocol and functions designed and marketed by the Microsoft Corporation. In the context of OLE 2.0, a compound document comprises a containing document (container) and an embedded document (embedded object) that is linked and embedded within the containing document.

In general, a containing application is an application program module that maintains a container, such as a compound document. The containing application provides storage for the compound document as well as a place for viewing and editing the embedded object amongst the containing document. A serving application is an application program module that creates an embedded object. The serving application creates an "object viewr" of the embedded object and displays the object view amongst the contents of the containing document itself. For example, a compound document could be a newsletter (container) having a chart (embedded object) displayed within the window that displays the newsletter.

According to the OLE 2.0 protocol, when an embedded object is edited, the user must first "activate" the embedded object. This is conventionally accomplished with a double click of the mouse on the displayed embedded object, which renders the embedded object to be "in place active" or "UI active". Once activated, the menus of an application program module that created the activated embedded object are negotiated with the containing application under the OLE 2.0 protocol. As a result of the menu negotiations the user sees a different set of menus that are relevant to the activated embedded object.

When the OLE compound document is stored, structured storage is utilized. Structured storage is a set of application programming interfaces (APIs) for describing a way to create a single file structure that can contain other file structures with the single file, similar to storing directories and additional files within a single directory. An implementation of this kind of structured storage for a compound document is also referred to as Doc Files. Those skilled in the art will be familiar with compound documents and the features and protocol of standard OLE 2.0 including structured storage techniques. Additional details of OLE 2.0 can be obtained by referring to "Inside OLE 2" by Kraig Brockschmidt published by Microsoft Press.

Once an OLE embedded object is embedded within the containing document, the OLE embedded object is stored in a format that is native to the application program module that created the embedded object, but is not necessarily the same as the file format for the application. The embedded object becomes tightly associated with the containing document and is stored in a single file along with the containing document. The embedded object can no longer be manipulated outside the confines of the containing document.

When viewing an embedded object, the embedded object is displayed within a single window or viewport along with the containing document. However, each embedded object or section of the OLE compound document cannot be solely viewed and edited within the entire viewport. Embedded objects are limited to being viewed and edited within only a portion of the window or viewport amongst the contents of the containing document.

Problems may arise when printing out an OLE compound document. For OLE compound documents, the containing application prints all sections of the OLE compound document, including the containing document as well as metafile representations of the embedded objects. This results in less than optimum printing control and print quality. For example, the containing application may not recognize the need for a page break when printing the representation of a large embedded spreadsheet or a large embedded graphic image. To resolve this quality problem, one approach is to individually print each section of the compound document by instructing the serving application program to print out each embedded object or section. However, this approach can allow other print jobs to interrupt the process of printing each section of the entire compound document because other print jobs can be processed after each section is printed. This results in confusion at the printer when sections are not consecutively printed as a single, uninterrupted print job and when the sections are not consecutively numbered.

Therefore, in the context of electronic documents, there is a need for "binding" or storing related sections of a compound document in a single file where the sections are of different file formats, maintained in an order, and maintained in a native format. Additionally, there is a need to view and edit ordered sections within a viewport and to consecutively print the ordered sections as an uninterrupted print job with better print quality and control and with consecutive page numbering.

SUMMARY OF THE PRESENT INVENTION

The present invention satisfies the above-described needs by providing a system and method for storing, viewing, editing, and processing ordered sections having differing file formats in a compound document. In one aspect of the present invention, the method stores a compound document having ordered sections of differing file formats. A binder file is initially created for storing the compound document in memory. An index structure is then created within the binder file. The index structure defines the order of sections within the binder file. A first file, which is stored in the binder file, has a first file format native to the program module that created the first file. A second file, which is stored in the binder file, has a second file format native to the program module that created the second file. The order between the first and second section is updated within the index structure in response to storing the first and second sections in the binder file. In this manner, sections of a compound document having differing file formats can be stored in one file structure while advantageously maintaining the order of sections and the native file format of each section.

Additionally, the second section can be removed from the binder file and stored as an external file that advantageously retains the native file format of the second section. Furthermore, the order of sections can be changed by altering the order stored in the index structure without altering the location where the first and second section are stored in memory. This is advantageous because the order of sections can be maintained and updated without inefficient and time-consuming changes of the memory locations for these sections.

In another aspect of the present invention, a method is described for viewing and editing sections having different file formats and stored in memory within a user-definable order. First, a viewport for viewing and editing the contents of each of the sections is displayed. One of the sections is selected for viewing in the viewport. The contents of the selected section are viewed in the viewport without viewing the contents of any of the unselected sections and regardless of where the sections are stored, e.g., within a compound document or as a separate document.

More particularly described, graphical images representing different sections can be displayed in a selection area in the user-definable order. Selection of a section typically involves selecting one of the graphical images, such as an icon or a thumbnail image of the selected section, in the selection area. Selection is preferably implemented with a single user-interface operation, such as a single mouse click, which allows the user to easily activate or view each section. The thumbnail image can be an image derived from either a particular page or from multiple pages of the selected section, thus giving the user an easier way to identify the contents of the selected section.

Additionally, a new section can be added or "bound" by selecting a representation of an existing file, such as an icon, and moving or "dragging" the representation over the selection area before releasing or "dropping" the representation onto the selection area. Upon release, the existing file is stored as a new section that maintains the native file format of the existing file. The user-definable order is updated as a result of adding the new section. This process makes it intuitive and easier for a user to add new sections of a binder document. The new sections can be stored either as separate document files while the binder file maintains the order of sections or within the binder file itself.

A portion of an existing file can be added as a new section. The contents of the existing file are displayed in a separate window before selection of a portion of the existing file contents. A representation of this selected portion of the existing file can be moved and released over the selection area to become a new section, as described above.

Additionally, a section can be removed or "unbound" by selecting a graphical image representing one of the sections. The selected section is then moved or "dragged" out of the viewport before releasing or "dropping" the graphical image. The dragged section is removed or copied from the binder file and stored as either an external file or a section within another binder document while retaining the native file format of the dragged section. In this manner, the external file can still be loaded, viewed, and edited by the application program module that created the removed or copied section.

In another aspect of the present invention, a system is provided for consecutively printing ordered sections of a compound document as a single, uninterrupted print job where each section has been created by a corresponding program module and has a different file format than other sections. The system has a processing unit (PU), an input device coupled to the PU, such as a keyboard or a mouse, a pixel-based display device coupled to the PU, and a memory storage device coupled to the PU. In this system, the PU is operative to select which of the sections to print. The PU is also operative to sequentially dispatch the corresponding program module that created each of the selected sections in order to consecutively print the selected sections, preferably with consecutive page numbers, as a single uninterrupted print job. In this manner, all printed pages of the selected sections are consecutively printed and confusion is avoided when printing compound documents having sections of differing file formats. By allowing each of the corresponding program modules to print their respective section, the print quality is enhanced.

In yet another aspect of the present invention, a computer-readable medium is described on which is stored a computer program for checking the spelling of text within ordered sections of a compound document. Each section is created by a corresponding program module. The computer program instructions, when executed, select the sections of the compound document in which to check the spelling of text. The corresponding program module that created the highest order section is dispatched to check the spelling of text from the highest order section. The dispatching step is sequentially repeated for the next highest order section until the spelling of text from all the selected sections has been checked. In this manner, the optimized individual spell checking routines from each of the corresponding program modules can be used to check the spelling of differently formatted sections. A similar operation can be performed to check the grammar of text within ordered sections of a compound document.

These and other advantages of the present invention will be appreciated from studying the following detailed description and drawings, and the appended claims.

BRIEF DESCRIPTION OF THE DRAWINGS

FIG. 7 is a flow diagram illustrating steps of the preferred method for adding an existing file as a new section of a binder file using a drag and drop technique.

DETAILED DESCRIPTION

Figure 1:
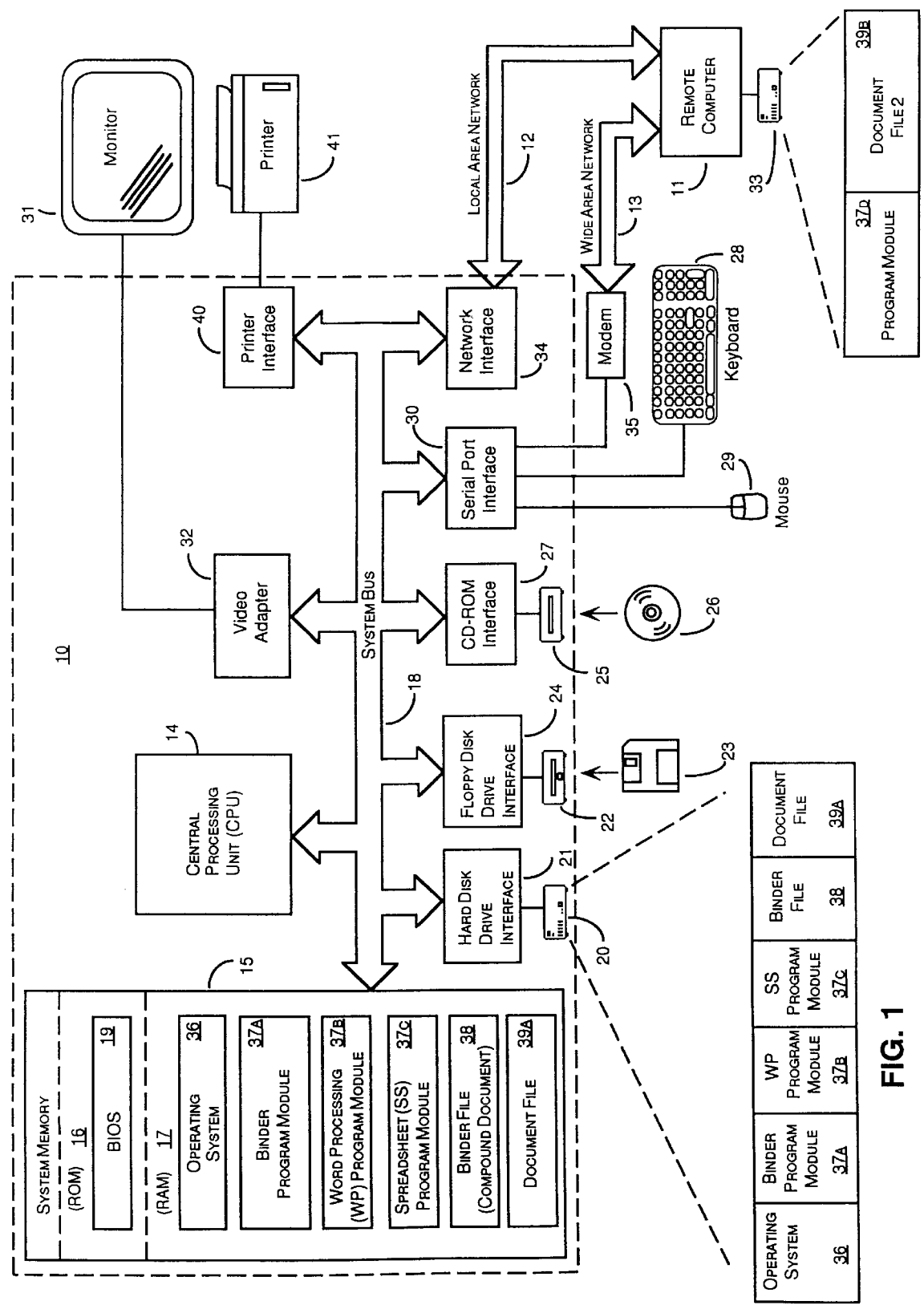
FIG. 1 is a block diagram of a computer system representing the operating environment of an embodiment of the present invention.

The present invention is directed to a system for storing, viewing, editing, and processing ordered sections in a compound document. The preferred embodiment of the present invention is represented by "OFFICE 95", a suite of word processing, spreadsheet, presentation, database, and time management application programs along with program modules that integrate and enhance these application programs. "OFFICE 95" is developed and marketed by Microsoft Corporation of Redmond, Wash.

Briefly described, "OFFICE 95" includes a binder program module that provides some integration and enhancement of the above-mentioned suite of application programs. The binder program module allows a user to create a binder document having components or sections from different application programs. Each section is a file that is maintained in a file format native to the application program module that created each section. The binder document is preferably stored in a single binder file. The binder program module displays a frame on a computer monitor containing menus, toolbars, a selection area, and a viewport. A user is able to view and edit the contents of each of section of the binder document through the viewport. The selection area shows graphical representations (icons) of each section in a user-definable order, from top (highest order) to the bottom. Different sections can be viewed and edited in the viewport simply by selecting different icons in the selection area. A section can be added to the binder document by selecting and dragging an existing file or a highlighted portion of an existing file over the selection area and releasing the mouse button. The format of the existing file is maintained while the existing file is stored as a section of the binder file. A section can also be removed from the binder document by dragging the section out of the selection area and onto the desktop to become an external file. The binder program module can also sequentially dispatch application programs to perform data processing tasks in an uninterrupted consecutive manner on sections of the binder document, including printing, spell checking, and grammar checking. Additionally, the binder program module can consecutively number pages when printing the different sections of the binder document.

Although the preferred embodiment will be generally described in the context of a binder program module and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

The detailed description which follows is represented largely in terms of processes and symbolic representations of operations by conventional computer components, including a processing unit (PU), memory storage devices, connected display devices, and input devices. Furthermore, these processes and operations may utilize conventional computer components in a heterogeneous distributed computing environment, including remote file servers, compute servers, and memory storage devices. Each of these conventional distributed computing components is accessible by the PU via a communication network.

The processes and operations performed by the computer include the manipulation of signals by a PU and the maintenance of these signals within data structures resident in one or more memory storage devices. These data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, information, elements, symbols, characters, numbers, points, records, entries, objects, images, files or the like. It should be kept in mind, however, that these and similar terms are associated with appropriate physical quantities for computer operations, and that these terms are merely conventional labels applied to physical quantities that exist within and during operation of the computer.

In general, a program module may use an interprocess communication to communicate with another program module. An interprocess communication is the ability of a task or process to exchange data with another task or process. Examples of such interprocess communications readily recognized by those skilled in the art include the use of pipes, semaphores, and shared memory. In the preferred embodiment, a program module calling an application programming interface (API) to command another program module to perform a task, such as printing the contents of a section to a temporary file, is one such interprocess communication.

It should also be understood that manipulations within the computer are often referred to in terms such as adding, comparing, displaying, dispatching, placing, altering. etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

FIG. 1 illustrates various aspects of the preferred computing environment in which an exemplary embodiment of the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local are a network 12 and a wide area network 13. Those of ordinary skill in the art will recognize that in this client/server configuration, the remote computer 11 may function as a file server or compute server.

The personal computer 10 includes a processing unit (PU) 14, preferably the 80486 or "PENTIUM" microprocessors manufactured by Intel Corporation of Santa Clara, Calif. However, it should be understood that the invention can be implemented on computers based upon other microprocessors, such as the "MIPS" family of microprocessors from the Silicon Graphics Corporation, the "POWERPC" family of microprocessors from both the Motorola Corporation and the IBM Corporation, the "PRECISION ARCHITECTURE" family of microprocessors from the Hewlett-Packard Company, the "SPARC" family of microprocessors from the Sun Microsystems Corporation, or the "ALPHA" family of microprocessors from the Digital Equipment Corporation.

The personal computer 10 also includes system memory 15 (including read only memory (ROM) 16 and random access memory (RAM) 17), which is connected to the PU 14 by a system bus 18. The BIOS 19 for the personal computer 10 is stored in ROM 16. Those skilled in the art will recognize that the BIOS 19 is a set of basic routines that helps to transfer information between elements within the personal computer 10. Howvever, it should be appreciated that other types of computers may transfer information between elements within the computer without the use of a BIOS 19 and that the invention can readily be implemented in such computers without a BIOS 19.

Within the personal computer 10 a hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 1) include track pads, track balls, joy sticks, data gloves, head trackers, and other devices suitable for positioning a cursor on a computer monitor 31. A printer 41 is connected to the system bus 18 via a printer interface 40. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules and data are provided to the personal computer 10 via one of the local or remote memory storage devices or computer-readable media, which may include the hard disk drive 20, floppy disk 23. CD-ROM 26, RAM 17, ROM 16, the remote memory storage device 33, and digital tapes (not shown). In the preferred embodiment, these program modules include an operating system 36, the binder program module 37a, and other program modules 37b–d, such as a word processing program module 37b and a spreadsheet program module 37c. In the preferred personal computer 10, the hard disk drive 20 is used to store these program modules once they are installed from a CD-ROM 26.

As previously mentioned, data is also stored on one of the memory storage devices, such as the hard disk drive 20 or the floppy disk 23. In the preferred embodiment, data is stored in a binder file 38 or a document file 39a, on the hard disk drive 20. However, is it contemplated that data may also be stored on a remote memory storage device 33.

When the personal computer 10 is turned on or reset, the Basic Input/Output System (BIOS) 19, which is stored in the ROM 16, instructs the PU 14 to load the operating system 36 from the hard disk drive 20 into the RAM 17. Once the operating system 36 is loaded into RAM 17, the PU 14 executes the operating system 36 and causes the visual elements associated with the user interface of the operating system 36 to be displayed on the monitor 31.

The operating system 36, in conjunction with the BIOS 19 and associated device drivers, provides the basic interface between the computer's resources, the user, and the binder program module 37a. The operating system 36 interprets and carries out instructions issued by the user. For example, when the user wants to load a program module, such as the binder program module 37a, the operating system 36 interprets the instruction (e.g. double clicking on the program module's icon) and causes the PU 14 to load the program code into RAM 17 from either the hard disk drive 20, floppy disk 23, CD-ROM 26, or the remote memory storage device 33. Once the program module 37a is loaded into the RAM 17, it is executed by the PU 14. In case of large programs, the PU 14 loads various portions of program modules into RAM 17 as needed.

As previously mentioned, the preferred embodiment of the present invention is embodied in the binder program module 37a, which is designed to operate in conjunction with Microsoft Corporation's "WINDOWS 95" or "WINDOWS NT" operating systems. However, it should be understood that the invention can be implemented for use with other operating systems including, but not limited to, Microsoft Corporation's "WINDOWS 3.1" operating system, IBM Corporation's "OS/2" operating system, and the operating system used in "MACINTOSH" computers manufactured by Apple Computer, Inc.

It should be appreciated that operating systems, such as the "WINDOWS 95" and "WINDOWS NT" operating system, are quite complex and provide a wide variety of services that allow users and programs to utilize the resources available in the personal computer. Those skilled in the art will be familiar with operating systems and their various features. For more comprehensive information regarding the "WINDOWS 95" and "WINDOWS NT" operating system and its interaction with programs, the reader may refer to any of a variety of publications, including the "Win32 Programmer's Reference" and "Advanced Windows", both published by Microsoft Press.

Likewise, those skilled in the art will appreciate that the preferred binder program module 37a provides a wide variety of features and functions in addition to those included in the brief description presented above.

The Binder Program Module

Figure 2:
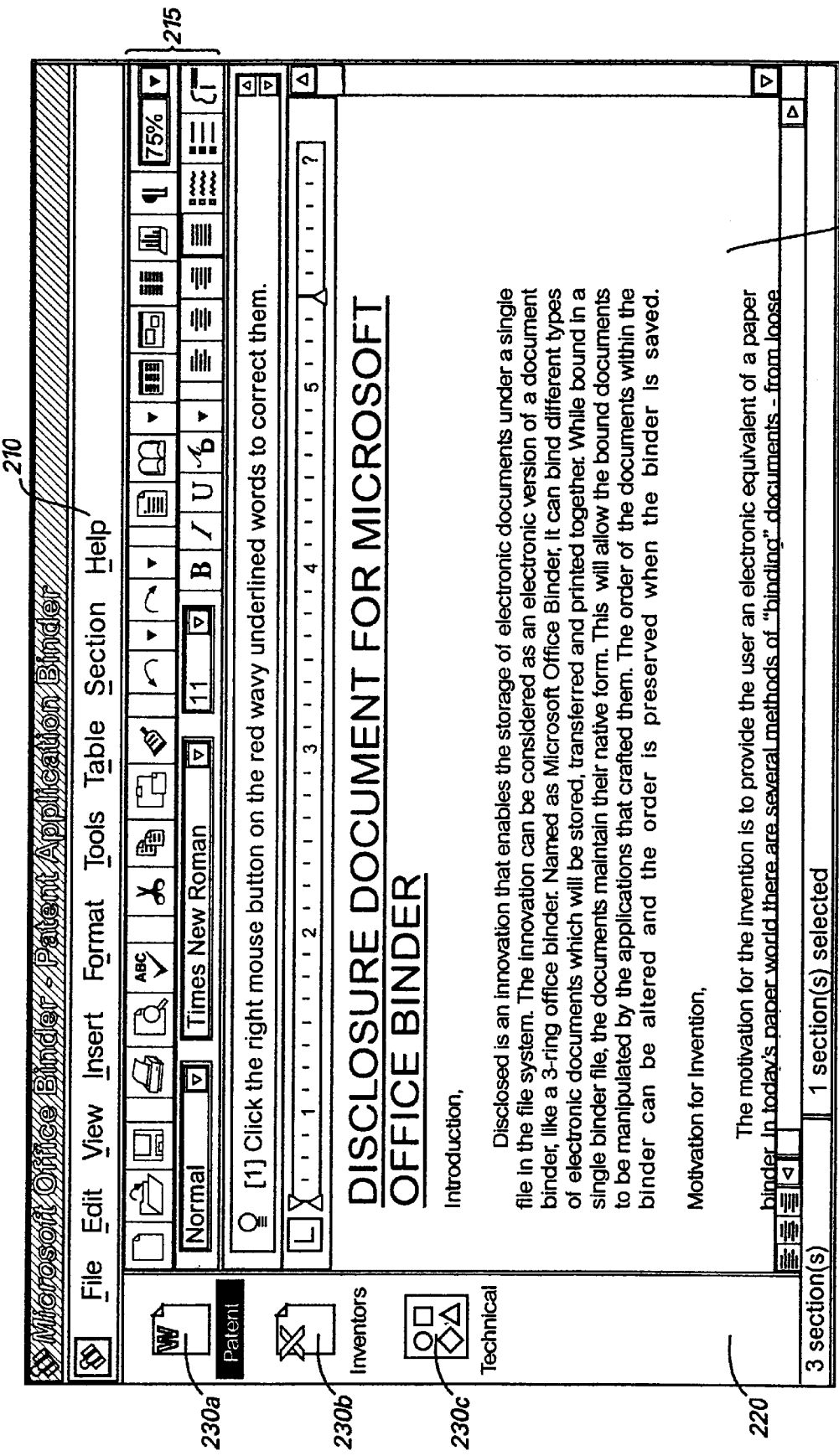
FIG. 2 is a screen display of the preferred binder program module for viewing and editing ordered sections of different file formats.
Figure 3:
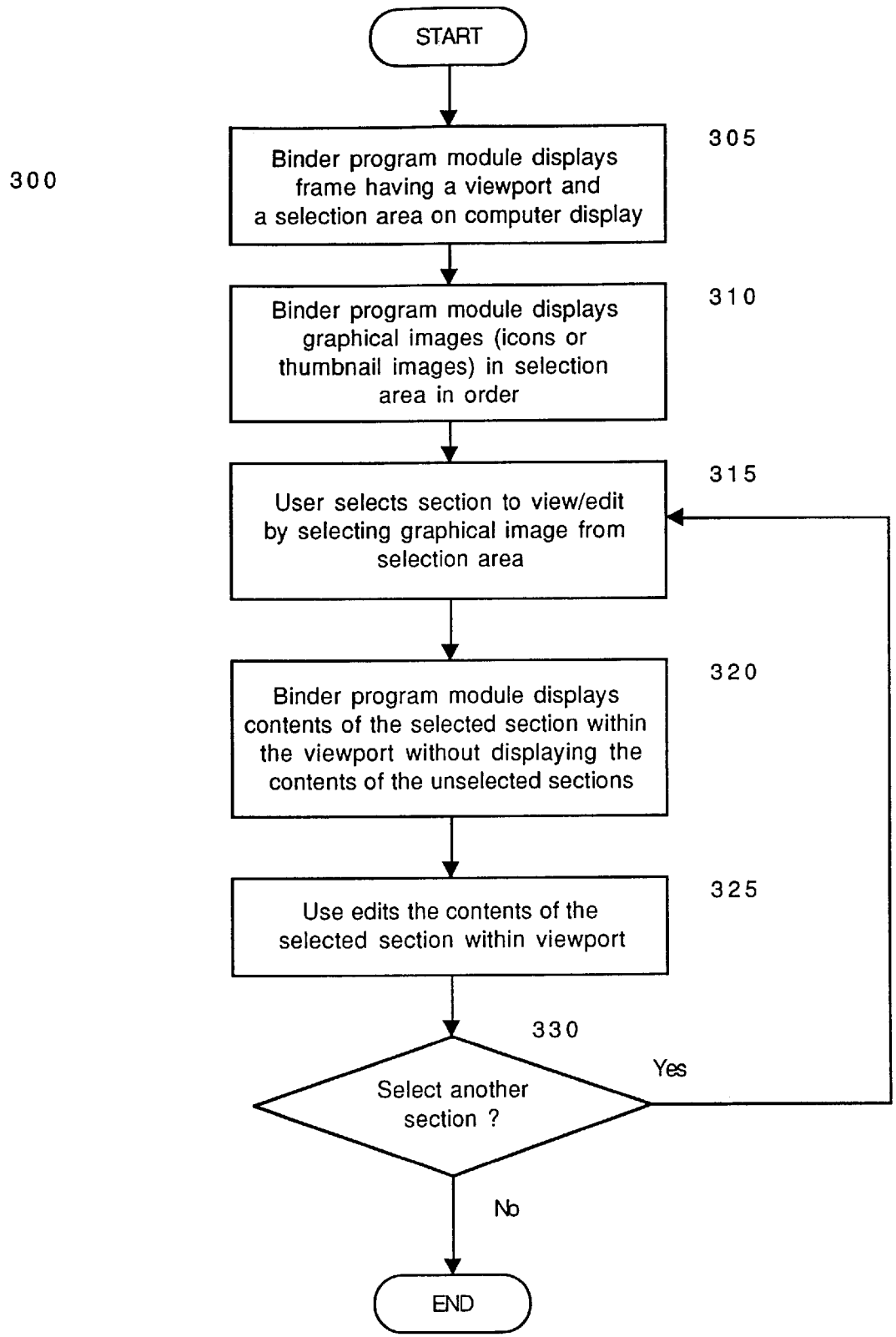
FIG. 3 is a flow diagram illustrating steps of the preferred method for viewing and editing the contents of ordered sections of different file formats.
Figure 8:
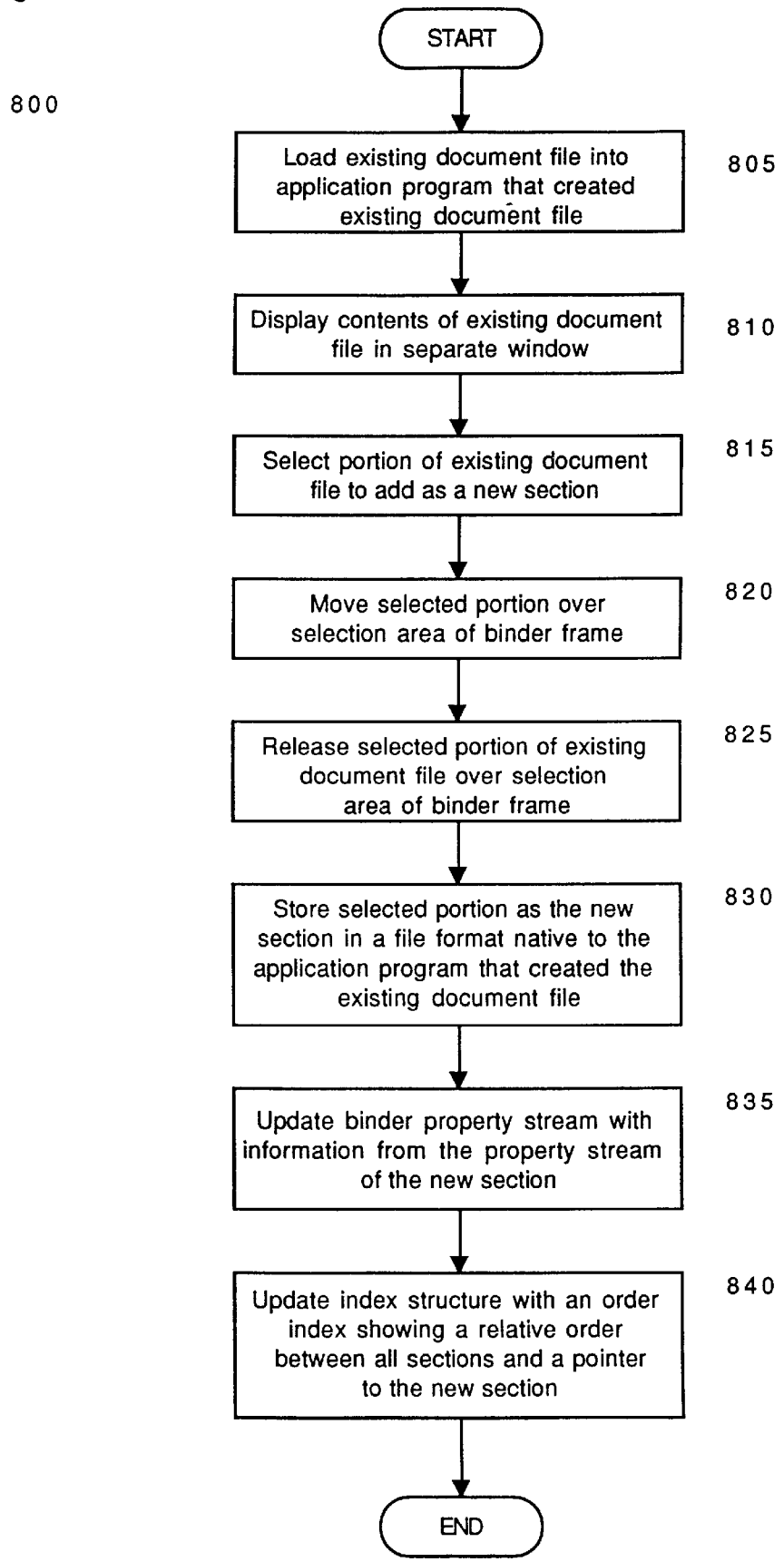
FIG. 8 is a flow diagram illustrating steps of the preferred method for adding a portion of an existing file as a new section of a binder file using a drag and drop technique.
Figure 9:
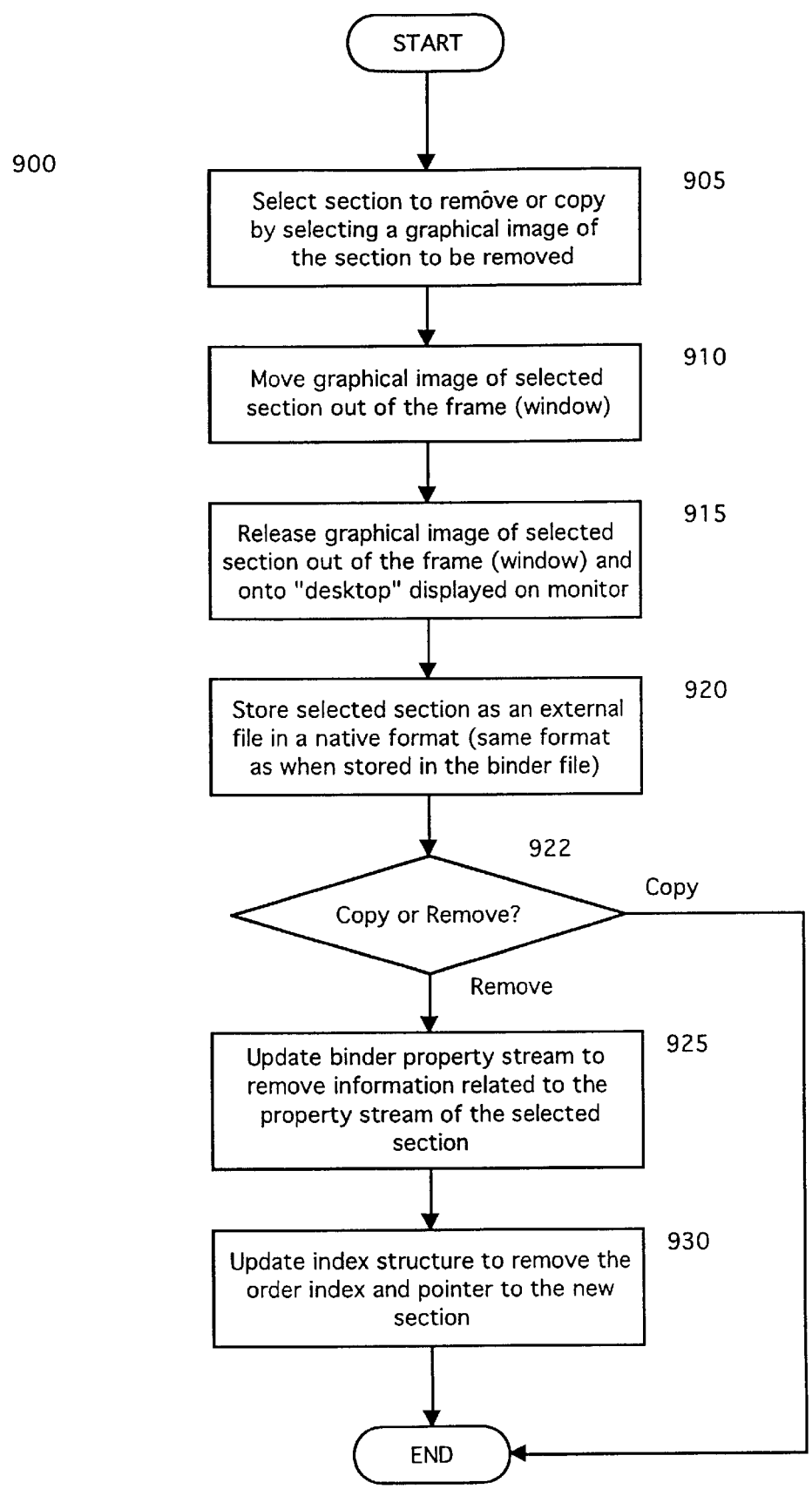
FIG. 9 is a flow diagram illustrating steps of the preferred method for removing or copying a section from a binder file using a drag and drop technique.
Figure 10A:
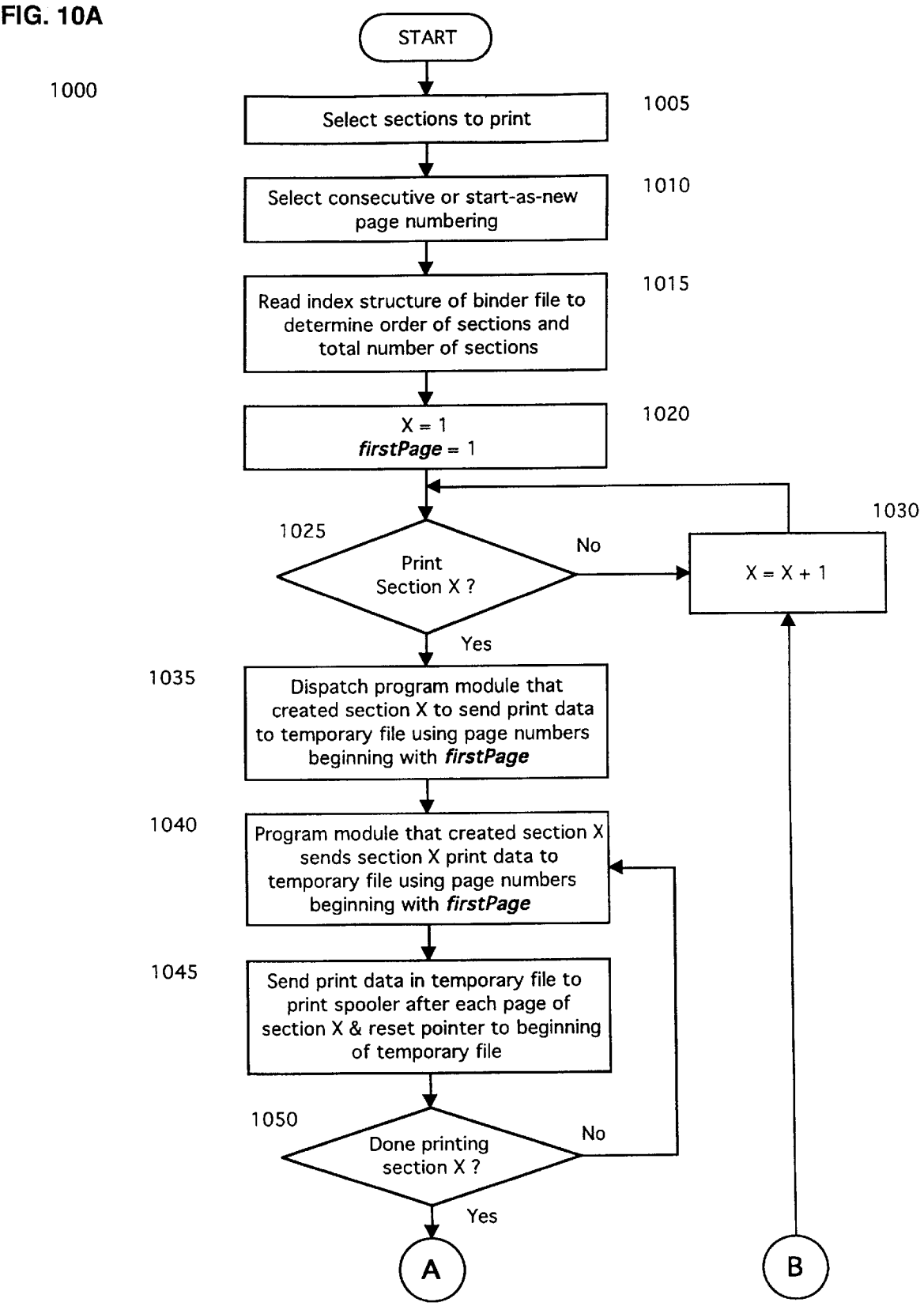
FIGS. 10A–10B comprise a flow diagram illustrating steps of the preferred method for sequentially dispatching each application program module related to each section to consecutively print all the sections of a binder file in a single uninterrupted print job.
Figure 10B:
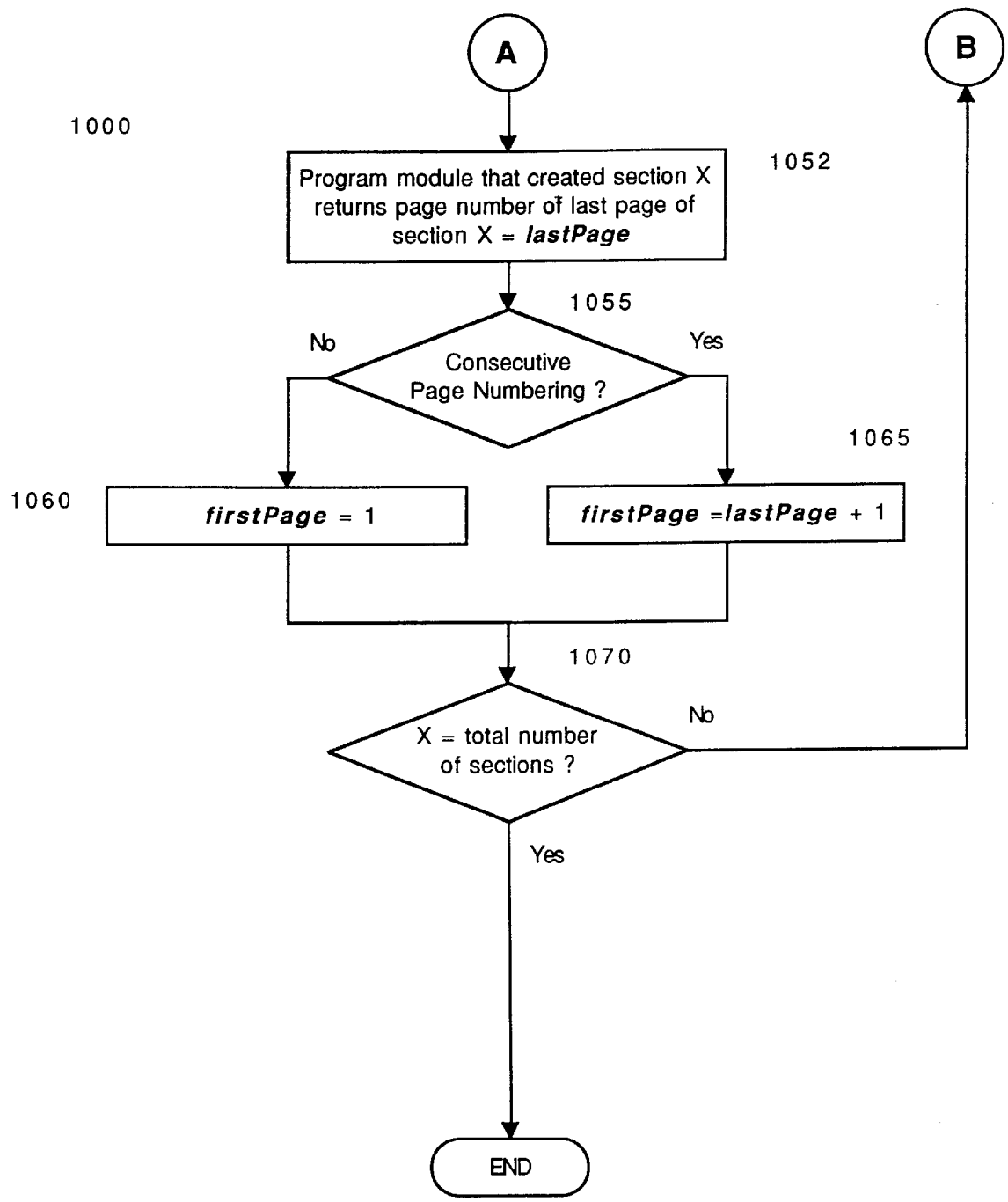
Figure 11:
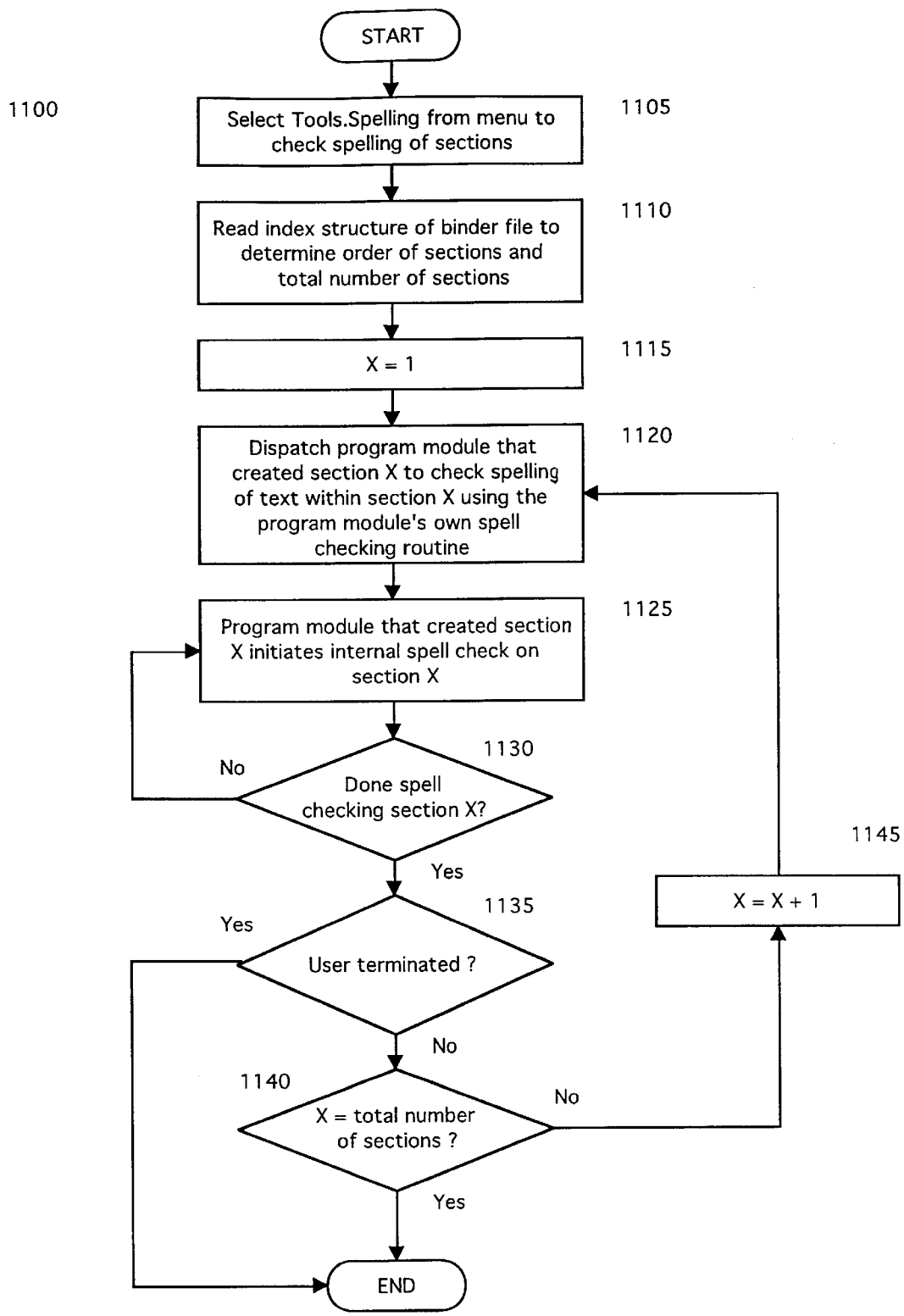
FIG. 11 is a flow diagram illustrating steps of the preferred method for sequentially dispatching each application program module related to each section to check the spelling of the contents of each section of a binder file in a single data processing task.

Turning now to FIGS. 2–11 embodiments of the present invention are described. FIG. 2 is a screen display illustrating the user interface for viewing and editing differently formatted sections from the preferred embodiment of the present invention. FIG. 3 is a flow diagram illustrating steps of the preferred method for viewing and editing differently formatted sections. FIG. 4 is a block diagram illustrating the interaction between the preferred binder program module, other application program modules, a binder file, and an existing file in memory. FIGS. 5A–5C and 6A–6B are diagrams and flowcharts, respectively, describing the structured storage aspects of the binder file and the existing file when a new section is added, when the order of sections is changed, and when removing a section from the binder file. FIGS. 7–9 are flow diagrams illustrating preferred methods for graphically adding a new section to the binder file or removing a section from the binder file using drag and drop techniques. FIGS. 10A, 10B, and 11 are flow diagrams of preferred methods for printing and checking the spelling the contents of each section of the binder file in an uninterrupted data processing task.

As mentioned above with regard to FIG. 1, the preferred binder program module 37a integrates separate existing document files 39a–b from other application program modules 37b–c to create a binder document. The binder document is essentially a collection of electronic documents or sections.

In one aspect of the disclosed embodiment, the binder program module 37a displays a user interface frame on the computer monitor 31 containing menus, toolbars, a selection area, and a viewport. A user is able to view and edit the contents of each section related to the binder file 38 through the viewport as discussed in more detail with regard to FIGS. 2 and 3. The selection area shows graphical representations of each section in a user-definable order, from top (highest order) to the bottom. Different sections can be viewed and edited in the viewport on the monitor 31 by selecting different icons in the selection area.

A section can be added to the binder file 38 by selecting and dragging a representation of an existing document file 39a or a highlighted portion of an existing file (not shown) over the selection area and releasing the mouse button. The native file format of the existing document file 39a is maintained when the document file 39a is stored as a section of the binder file 38. A section can also be removed from the binder file 37a by selecting the desired section, "dragging" the section out of the selection area and onto the desktop, and dropping the section. The section becomes a document file 39a having the same file format as the section and capable of being manipulated by the application program module 37b–d that created the section. Adding and removing sections of the binder document are discussed below in more detail with regards to FIGS. 2, and 4–9.

In another aspect of the disclosed embodiment, the binder document is preferably stored in a single binder file 38, although the sections of the binder document may be stored in separate files. The binder document has separate components or sections created by different application program modules 37b–d. A "section" is defined to be a file having the content of part of the binder document. For example, a first section may be a word processing document and a second section man be a spreadsheet. Sections are preferably stored within the binder file 38 along with the order of sections. Alternatively, each section may be stored as separate document files 39a–b with the order of sections maintained in the binder file 38. Each section is maintained in a file format native to the application program module that created each section. This aspect is further discussed below with regard to FIGS. 49.

In yet another aspect of an embodiment of the present invention, the binder program module 37a can sequentially dispatch application program modules 37b–c to perform data processing tasks in an uninterrupted, consecutive manner on each of the sections of the binder file 38. These data processing tasks include printing, spell checking, and grammar checking each of the ordered sections of the binder document. The binder program module 37a can also consecutively number pages when printing the different sections of the binder file 38. The dispatching of application program modules 37b–c related to the binder file 38 is discussed in more detail with regard to FIGS. 10 and 11.

Binder Program Module User Interface

FIG. 2 is a screen display illustrating the user interface of the preferred binder program module 37a (FIG. 1) for viewing and editing ordered sections having different file formats. Referring to FIGS. 1 and 2, a frame 205 is displayed on the monitor 31 containing menus 210, toolbars 215, a selection area 220, and a viewport 225. The frame 205 provides a user interface for viewing and editing the contents of the binder document, i.e., each section that is part of the binder document. Graphic images 230a–c representing each section of the binder document are shown in the selection area 220. The graphic images 230a–c are shown in a user-definable order, from top (highest order or first in the binder document) to the bottom (lowest order or last in the binder document). In the current commercial embodiment of the present invention, the graphic images 230a–c are icons. However, the graphic images 230a–c are preferably images derived from the contents of each section known as "thumbnail" images. In this embodiment, a thumbnail image may be derived from either a particular page of the section, such as the first page, or multiple pages of the section. Using thumbnail images is more intuitive for a user because the contents or subject of the section can be easily identified as opposed to using an icon representing the section.

To view the contents of a section, the user must first select the section to be active. The active section is selected by choosing a graphical image 230a representing the desired section in the selection area 220. Once selected the contents of the active section are displayed in the viewport 225. Thus, the selection area 220 enables a user to easily navigate between the different sections of a binder document with a single user-interface operation, such as a single mouse click.

In general, the viewport 225 is an area within the frame 205 where the content of different sections can be viewed and edited. By selecting different graphical images 230a–c in the selection area 220, a user is able to view and edit the contents of each section of the binder document through the viewport 225. This allows a user to view the contents of sections having different file formats, such as a word processing document or a spreadsheet, through a single viewport 225.

Referring to the example illustrated in FIG. 2, an icon 230a representing the "Patent" section is highlighted with a dark background to show that the "Patent" section has been selected. The contents of the "Patent" section are displayed in the viewport 225 by the application program module that created the "Patent" section (the word processing program module 37b). The menus 210 and the toolbars 215 in the frame 205 operate in conjunction with the application program module displaying the active section. To view or edit another section of the binder document, such as the "Inventors" section, the user can select an icon 230b representing the "Inventors" section of the binder document. The "Inventors" section would be implicitly activated and the content of the "Inventors" section would then be displayed in the viewport 225 by the spreadsheet application program module 37c.

As previously mentioned, binder documents are essentially collections of electronic documents or sections. To create a new binder document, the user can select the File·New menu selection from the menus 210. In response, a new binder document is created without any sections shown in the selection area 220 of the frame 205. To open an existing binder document the user can select the File·Open menu selection from the menus 210. Those skilled in the art will be familiar with the operation of drop down menus such as the menus 210 displayed in FIG. 2.

Just as the order of subjects within any bound textbook is crucial to an understanding of the textbook material, the order of sections in a binder document is very important. In the preferred embodiment, the order of sections shown in the selection area 220 can be efficiently changed by a drag and drop operation. This operation allows a user to quickly and intuitively rearrange the order of sections of the binder document. Referring to the example illustrated in FIG. 2, a user may desire to have the "Inventors" section come first in the binder document instead of the "Patent" section. The user uses the mouse 29 (FIG. 1) to position the cursor over the icon 230b representing the "Inventors" section and presses the left button on the mouse 29. While still pressing the button on the mouse 29, the user would move or "drag" the "Inventors" section icon 230b above the "Patent" section icon 230a while still remaining within the selection area 220. The user then releases the button on the mouse 29 to "drop" the "Inventors" section icon 230b. Using this drag and drop technique within the selection area 220, the user is able to change the user-definable order of sections. Those skilled in the art will be familiar with dragging and dropping items, such as icons or graphical images 230a–c, by using a mouse 29.

New sections can be added to a binder document in various ways. First, a new section can be created b prompting the binder program module 37a to display a dialog box on the monitor 31. In a more efficient and intuitive manner, a new section can also be created by simply selecting a representation (not shown) of an existing document file 39a, preferably an icon, outside the frame 205 and performing a "drag and drop" processes, as described above, over the selection area 220. This drag and drop process for adding a new section from an existing document file 39a is discussed in more detail below with regards to FIG. 7.

Additionally, a new section can be created by selecting a portion of an existing document file 39a before performing the "drag and drop" process described above over the selection area 220. The contents of the existing document file 39a must be visibly displayed on the monitor 31 in a separate window (not shown) and highlighted or selected. Once the portion of the existing file 39a is selected, a drag and drop process over the selection area 220 is performed to create the new section. The process for creating a newt section by dragging and dropping a portion of an existing document file 39a to add a new section is discussed in more detail below with regards to FIG. 8.

In each way of adding new sections from existing document files 39a, a key advantage is that the new section retains the native file format of the existing document file 39a. Furthermore new sections of the binder document can have a different file format than the file formats of existing sections.

In the process of creating a binder document with numerous sections a user may desire to remove a section from the binder document. The preferred embodiment of the present invention provides a method of removing or "exploding" a section from the binder document by using a drag and drop process. In this manner, the removed section becomes a document file 39a external to the binder file 38 while retaining the same native file format as the removed section. The graphical image 230a–c of the removed section no longer appears in the selection area 220 of the frame 205. A key advantage is that upon removal, the removed section can become a separate document file 39a that can be used standalone again, i.e., can be read and manipulated by the application program module that originally created the section. The ability for sections to retain a native file format and to be used in a standalone manner after removal from the binder file is quite different from most other embedded objects and containers in the art. This removal process is discussed later in more detail with regards to FIG. 9.

The preferred embodiment of the present invention is implemented in an object-oriented computing environment. Those skilled in the art will be familiar with the concept of object-oriented programming, objects, and object classes defining methods and properties of objects. The preferred embodiment is also implemented with some aspects of the previously discussed OLE 2.0 protocol. The binder program module 37a is a containing application and the binder document in the binder file 38 is a container. The application program modules 37b–d that create sections of the binder document adhere to the conventional OLE 2.0 protocol when displaying the menus 210 in the frame 205 of the binder program module 37a. The binder program module 37a stores the binder document in the binder file 38 using structure storage application programming interfaces (APIs) from OLE 2.0. Finally, the underlying application program module 37b–c displays the active section of the binder document within the window controlled by the binder program module 37a (containing application).

However, there are also some important differences from OLE 2.0 compound documents in the implementation of the preferred embodiment of the present invention. First, the binder document in the binder file 38 is preferably implemented as an OLE container that can "contains" sections that are document objects (DocObjects) as opposed to OLE embedded objects. Basically, the DocObjects technology is a set of extensions to OLE Documents, the compound document technology of OLE. The extensions are in the form of additional interfaces that allow what mostly looks like an embeddable in-place object to represent an entire document instead of a single piece of embedded content. As with OLE Documents. DocObjects involve a container (such as the binder program module 37a) that provides the display space (such as the viewport 225) for DocObjects and servers that provide the user interface and manipulation capabilities for DocObjects themselves.

A DocObject server is a product that supports one or more document object classes, where each object itself supports the extension interfaces that allow the object to be activated in a suitable container. A DocObject is best understood by distinguishing it from a standard OLE embedded object. Following the OLE convention, an embedded object is one which is displaced within the "page" of a document that "owns it" where the document is managed by an OLE container. The container stores the embedded object's data with the rest of the document.

However, embedded objects are limited in that they do not control the "page" on which they appear. By necessity, embedded objects tend to be rather small objects such as a picture that supplements the surrounding text (provided by a container) or a spreadsheet that clarifies its supporting analysis (provided by a container).

By contrast, a document object provided from a DocObject server is essentially a full-scale conventional document which is embedded as an object within another DocObject container, such as the binder document. Unlike embedded objects, DocObjects have complete control over their "pages" and the full power of the application program is available for the user to edit them. Thus. unlike embedded objects, DocObjects tend to be full-scale, robust document that exploit the complete native functionality of the server (application program) that creates them. Users can create documents (called sections within a binder document) using the full feature set and power of their favorite application program, if the application program supports DocObjects. Furthermore, users can treat the resulting project (such as the binder document) as a single entity, which can be uniquely named, saved, transmitted to co-workers for review or editing, or printed as a single entity.

In the same way, it is contemplated that a user of an Internet browser can treat the entire network as well as local file systems as a single document storage entity with the ability to browse the documents in that storage from a single location.

Thus, using the enhanced interfaces or APIs of DocObjects technology, the underlying application program modules 37b–d can display a "document view" of a selected section of the binder document within the viewport 225. Additionally, the enhanced APIs allow the binder program module 37a to manage the printing process of the entire binder document so that each section is consecutively printed in a single uninterrupted print job with consecutive page numbering of all sections. The enhanced APIs and differences with the OLE 2.0 protocol are discussed in more detail below with regard to FIGS. 4, 6, 7, and 10.

The way each section is manipulated or edited is also different because the preferred embodiment uses DocObjects rather than the standard OLE 2.0 protocol. In the preferred embodiment, sections are implicitly selected in the selection area 220 as the active section (which makes the section "inplace active") using a single user-interface operation as opposed to the explicit activation requirement of double clicking on an embedded object using OLE 2.0 protocol.

In summary, FIG. 2 illustrates a screen display where a user can intuitively view ordered sections having differing file formats in the viewport 225 of the frame 205 of the binder program module 37a. A user can navigate through the binder document by selecting different graphic images 230a–c representing different sections of the binder document, similar to turning to different tabbed sections in a three-ring binder. New sections of the binder document can be easily added by dragging and dropping an existing document file 39a on the selection area 220 or by dragging and droppings a portion of the existing document file 39a onto the selection area 220. These new sections retain the native file format of the application program module 37b–d that created the existing document file 39a. Sections can also be removed or exploded from the binder document by dragging and dropping a graphic image 230a–c from the selection area 220 to a location on the monitor 31 outside the frame 205.

FIG. 3 is a flow diagram illustrating steps of the preferred method 300 for viewing and editing the contents of ordered sections of different file formats. Referring now to FIGS. 1, 2, and 3, start at the START step and the frame 205 is displayed by the binder program module 37a on the computer monitor 31 at step 305. As previously mentioned, the frame 205 has a viewport 225 for viewing the contents of a binder document section and a selection area 220 for displaying graphic images 230a–c (icons or thumbnail images) representing the sections of the binder document. At step 310, the graphic images 230a–c are displayed by the binder program module 37a in the selection area 220 of the frame 205.

At step 315, the user can select which binder document section to view or edit by selecting one of the graphical images 230a–c from within the selection area 220. The selected graphical image 230a corresponds to a selected or active section of the document. At step 320, the contents of the selected section are displayed by the binder program module 37a in the viewport 225 as a "document view". In the "document view", the contents of the selected section are displayed as a full-scale, conventional document. None of the contents from any of the unselected sections are displayed in the viewport 225. This is different from the conventional "object view" in OLE 2.0 of an embedded object within a containing document, as previously discussed with regards to DocObjects technology.

At step 325, the contents of the selected section displayed in the viewport 225 can be edited by a user. For example, the contents of the "Patent" section can be edited by typing new text or changing existing text in the viewport 225 as shown in FIG. 2. At step 330, if another section is desired for viewing or editing, the other section is selected in step 315 before the contents of the other section are displayed in the viewport 225 in step 320. Otherwise, the method 300 terminates at the END step. Thus the contents of ordered binder document sections having different file formats can be intuitively viewed and edited.

Binder Program Module Operation

Figure 4A:
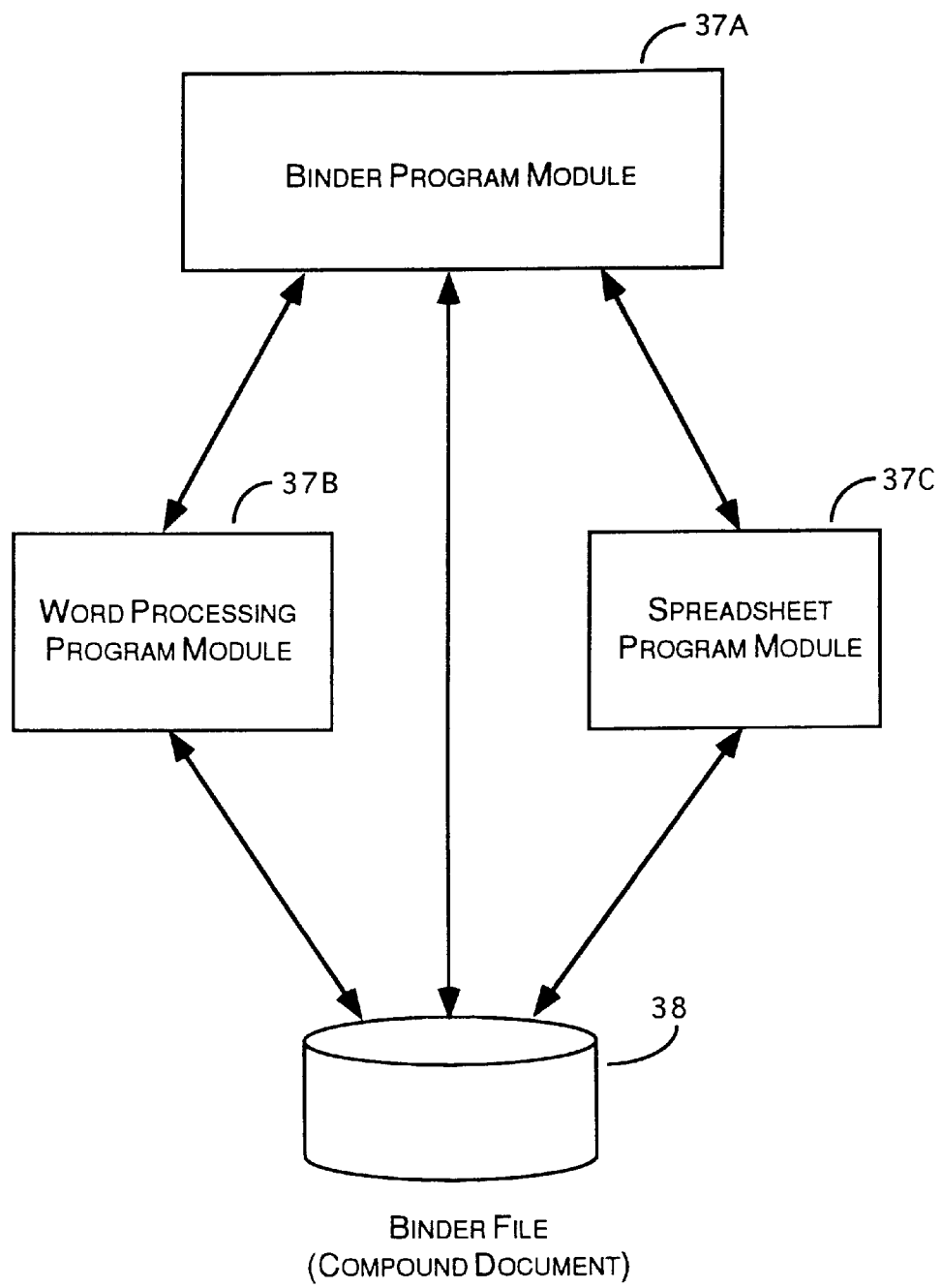
FIGS. 4A–4B comprise a block diagram illustrating the interaction between program modules and files when differently formatted sections of a binder document are stored within a binder file and when differently formatted sections of a binder document are stored in separate document files.
Figure 4B:
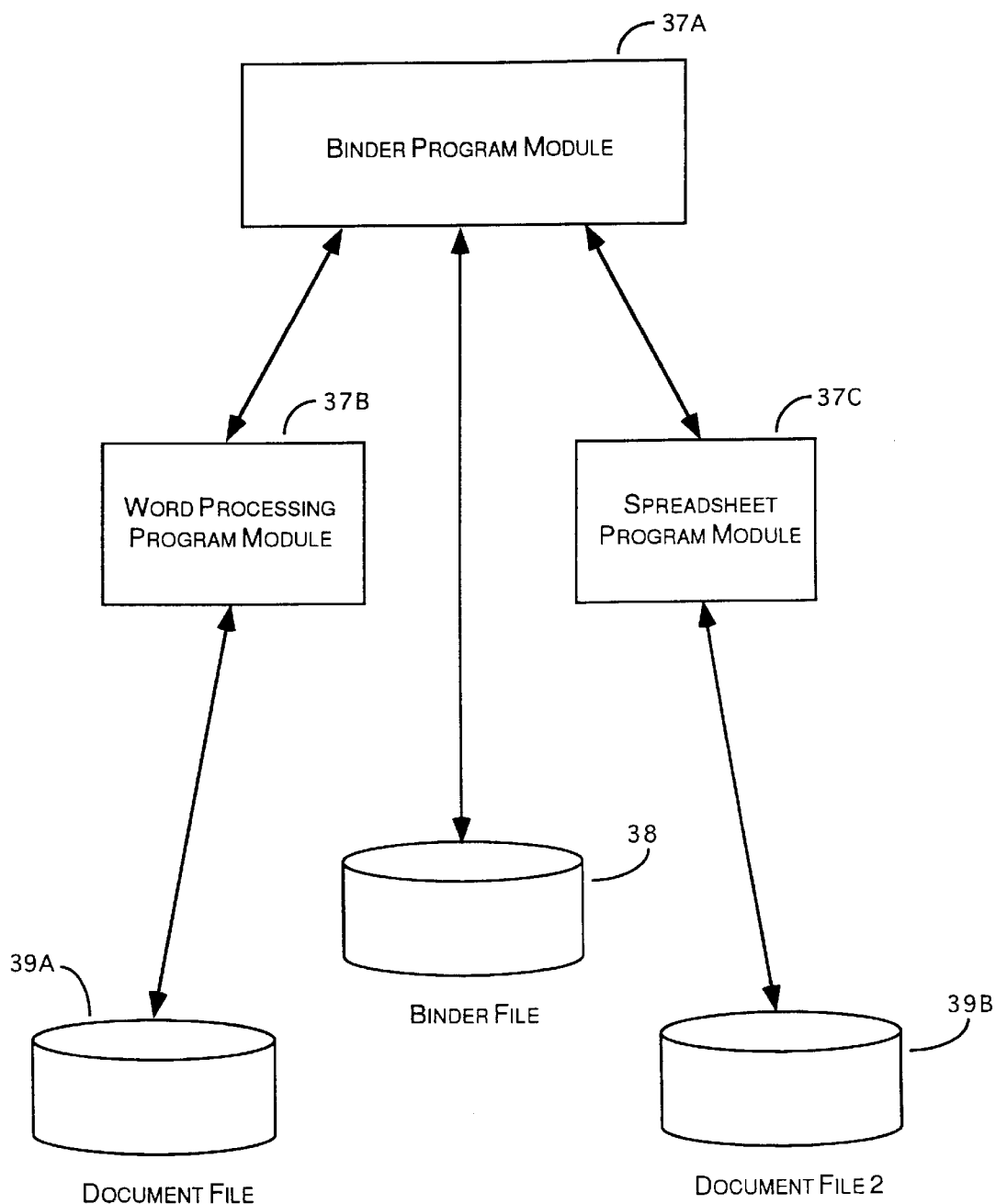

FIGS. 4A and 4B are block diagrams illustrating the interaction between the binder program module 37a, the binder file 38, other application program modules 37b–c, and existing document files 39a in two different embodiments of the present invention. FIG. 4A illustrates the interaction between the above mentioned program modules and files when the ordered sections of the binder document are stored within the binder file 38. FIG. 4B illustrates an alternative embodiment of the present invention that stores the ordered sections of the binder document in separate document files 39a.

In the preferred embodiment, the binder document sections support standard OLE 2.0 inplace functionality. Those skilled in the art will be familiar with the interfaces related to standard OLE 2.0 inplace functionality, such as IOleInPlaceObject, IOleInPlaceActiveObject, IPersistStorage, IOleObject, and IDataObject. The IOleInPlaceObject API is used primarily to allow a container to communicate with its contained object, and includes functions for deactivating the object and its associated user interface. The IOleInPlaceActiveObject API provides an interface for the frame to communicate with currently active objects. The IPersistStorage API is the interface through which a container communicates with the contained document regarding storage. The IDataObject API allows data to be passed to and from the contained document. The IOleObject API is the primary interface though which an embedded object provides functionality to its container. Additional information concerning standard OLE 2.0 interfaces can be obtained from "Inside OLE 2.0" by Kraig Brockschmidt, published by Microsoft Press, and "OLE 2.0 Programmer's Reference," published by Microsoft Press.

In the preferred embodiment, the binder document sections support several other APIs to be DocObjects. These APIs include IMsoDocument, IMsoView, and IMscDocumentSite.

The IMsoDocument API is specific to DocObjects. An object cannot act as a DocObject unless it support this API. The IMsoDocument API includes three functions. The CreateView ( ) function is called to create a new view of the contents of the DocObject or to load a previously saved view. The GetDocMiscStatus) function is used to retrieve miscellaneous information about a DocObject. The EnumView ( ) function enumerates the views that are provided for the DocObject.

The IMsoView API includes the functions that facilitate the behavior of the view, which is logically partitioned from the frame in which it is displayed. The IMsoView API includes 13 functions. The SetInPlaceSite function establishes the in-place site that encapsulates the viewport and the frame context of the viewport. The GetInPlaceSite ( ) function returns the current in-place site for the view. The SetDocument ( ) function returns the document that is associated with the view. The SetRect ( ) function sets the rectangular coordinates of the view port in the client coordinates of the views window. The GetRect ( ) function returns the rectangular coordinates of the view port in the client coordinates of the view window. The SetRestComplex( ) function sets the rectangular coordinates of the view port scroll bars and size box. The Show ( ) function is called to show or hide the view. The UIActivate ( ) function is called to UI activate or deactivate the view. The Open ( ) function asks a view to display itself in a native window. The Close ( ) function is called to close a view and release its site pointer. The SaveViewState ( ) function saves the current view state into a stream that is passes by the client to the view. The ApplyViewState ( ) function applies a previously saved view state to a view. The Clone ( ) function creates a new view having a same view context as the view that provides the function but has a different viewport.

The IMsoDocumentSite API specifies a function, ActivateMe ( ), used to activate a DocObject. In the preferred embodiment, sections are activated by selecting a graphical image 230a–c from the selection area 220 or when a binder document is opened, in which case the last active section when the binder document was closed is activated. The binder program module 37a calls the ActivateMe ( ) function to activate the section (DocObject) corresponding to the selected graphical image 230a–c. The contents of the active section are then displayed in the viewport 225.

Furthermore, in the preferred embodiment, binder document sections support two other APIs specific to a DocObject implementation for dispatching commands between underlying application program modules 37b–c (IMsoCommandTarget) and printing of binder document sections (IPrint). These APIs are discussed below with reference to FIG. 4A.

Referring now to FIGS. 2 and 4A, a binder document comprises sections created by different application program modules 37b–c, such as a word processing program module 37b and a spreadsheet program module 37c. The binder program module 37a is implemented as an executable program module that organizes the sections as a single binder document and preferably stores information about the binder document in a single file, such as a binder file 38. The binder program module 37a activates sections and prints sections by dispatching commands to each of the underlying application program modules 37b–c, preferably using the IMsoCommandTarget API. The IMsoCommandTarget API is a command dispatch interface that supports dispatching commands between the binder program module 37a and the underlying application program modules 37b–c related to a section of the binder document. The IMsoCommandTarget API is called when a user brings one of the menus 210 (FIG. 2) down. The callee (the underlying application program module 37b–c) looks at each command in a specific array of supported commands and sets the appropriate bits in a field of the commands. Table 1 provides a list from the preferred embodiment of the array of the supported commands and a functional description of the listed command.

TABLE 1

| Array Listing | Description |
| --- | --- |
| MSOCMDID_OPEN | File.Open menu selection |
| MSOCMDID_NEW | File.New menu selection |
| MSOCMDID_SAVE | File.Save menu selection |
| MSOCMDID_SAVEAS | File.Save As menu selection |
| MSOCMDID_SAVECOPYAS | File.Save Copy As menu selection |
| MSOCMDID_PRINT | File.Print menu selection |
| MSOCMDID_PRINTPREVIEW | File.Print Preview menu selection |
| MSOCMDID_PAGESETUP | File.Print Page Setup menu selection |
| MSOCMDID_SPELL | Tools.Spelling menu selection |
| MSOCMDID_PROPERTIES | File.Properties menu selection |
| MSOCMDID_CUT | Edit.Cut menu selection |
| MSOCMDID_COPY | Edit.Copy menu selection |
| MSOCMDID_PASTE | Edit.Paste menu selection |
| MSOCMDID_PASTESPECIAL | Edit.Paste Special menu selection |
| MSOCMDID_UNDO | Edit.Undo menu selection |
| MSOCMDID_REDO | Edit.Redo menu selection |
| MSOCMDID_SELECTALL | Edit.Select All menu selection |
| MSOCMDID_CLEARSELECTION | Edit.Clear Selection menu selection |

The callee (one of the application program modules 37b–c) then uses the IMsoCommandTarget API to return an error code indicating whether the requested command was successfully executed, whether execution failed, or whether the command is not supported. Thus, the commands are dispatched between the binder program module 37a and underlying application program modules, such as the word processing program module 37b and the spreadsheet program module 37c, preferably using the IMsoCommandTarget API.

The IPrint API, which is preferably used to dispatch the underlying application program modules 37b–c to consecutively print sections of the binder document, is described in below with regard to FIG. 10.

Referring back to FIG. 4A, the binder program module 37a commands application program modules 37b–c to save the data comprising the contents of an individual section, preferably using the IMsoCommandTarget API. In one embodiment of the present invention, each section of the binder document is stored within the single binder file 38. Each section is created by an underlying application program module, such as the word processing program module 37b or the spreadsheet program module 37c, and is maintained within the binder file 38. When a user selects a section as the "active section", the binder program module 37a dispatches the corresponding application program module, such as the word processing program module 37b, to read the data of the active section from within the binder file 38, preferably using the IMsoCommandTarget API.

In response to reading the data of the active section, the corresponding application program displays the data within a viewport 225 controlled by the binder program module 37a. In this manner, different sections of the binder document can be implicitly activated so that a user can view and edit the contents of the activated sections.

The binder program module 37a can also directly read and write to the binder file 38. More specifically, the binder program module 37a maintains a list defining the sections held in the binder file 38 and can update the order of sections of the binder document. Sections and their order are maintained in a header of the binder file 38, which is discussed in more detail below with regards to FIG. 5A. Thus, the binder program module 37a manages the collection of electronic documents called sections. In other words, the binder program module 37a tracks the number and the order of sections and provides a single viewport in which to view and edit the content of ordered sections having different file formats.

FIG. 4B illustrates an alternative embodiment of the present invention that stores the sections of the binder document in separate document files 39a as opposed to within the binder file 38. Referring now to FIGS. 2 and 4B, sections of the binder document are not stored within the binder file 38. Instead, the sections are stored by their corresponding application program modules 37b–c in their native file format in separate existing document files 39a–b, respectively. When instructed to display the active section by the binder program module 37a, a corresponding application program module, such as the word processing application program module 37b, reads the data of the active section from the separate existing document file 39a. However, the number and order of sections are still maintained by the binder program module 37a in the binder file 38. Thus, in this alternative embodiment, the binder program module 37a provides a single viewport in which to view and edit the content of ordered sections having different file formats even when the sections are stored in separate document files 39a–b.

File Structure of a Binder File

Figure 5A:
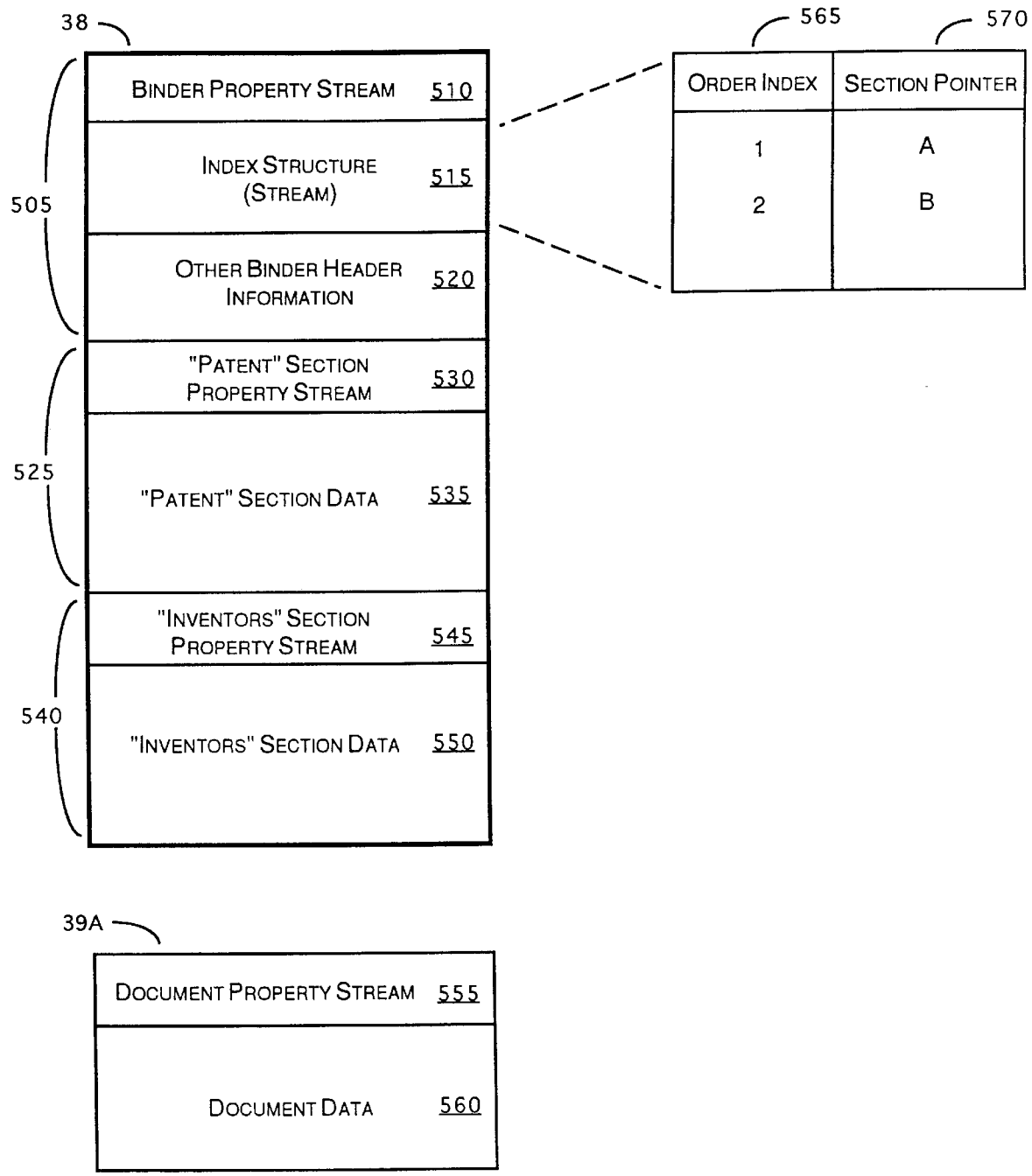
FIGS. 5A–5C comprise a diagram illustrating the structured storage aspects of a binder file and an existing file when a new section is added and when the order of sections is changed.
Figure 5B:
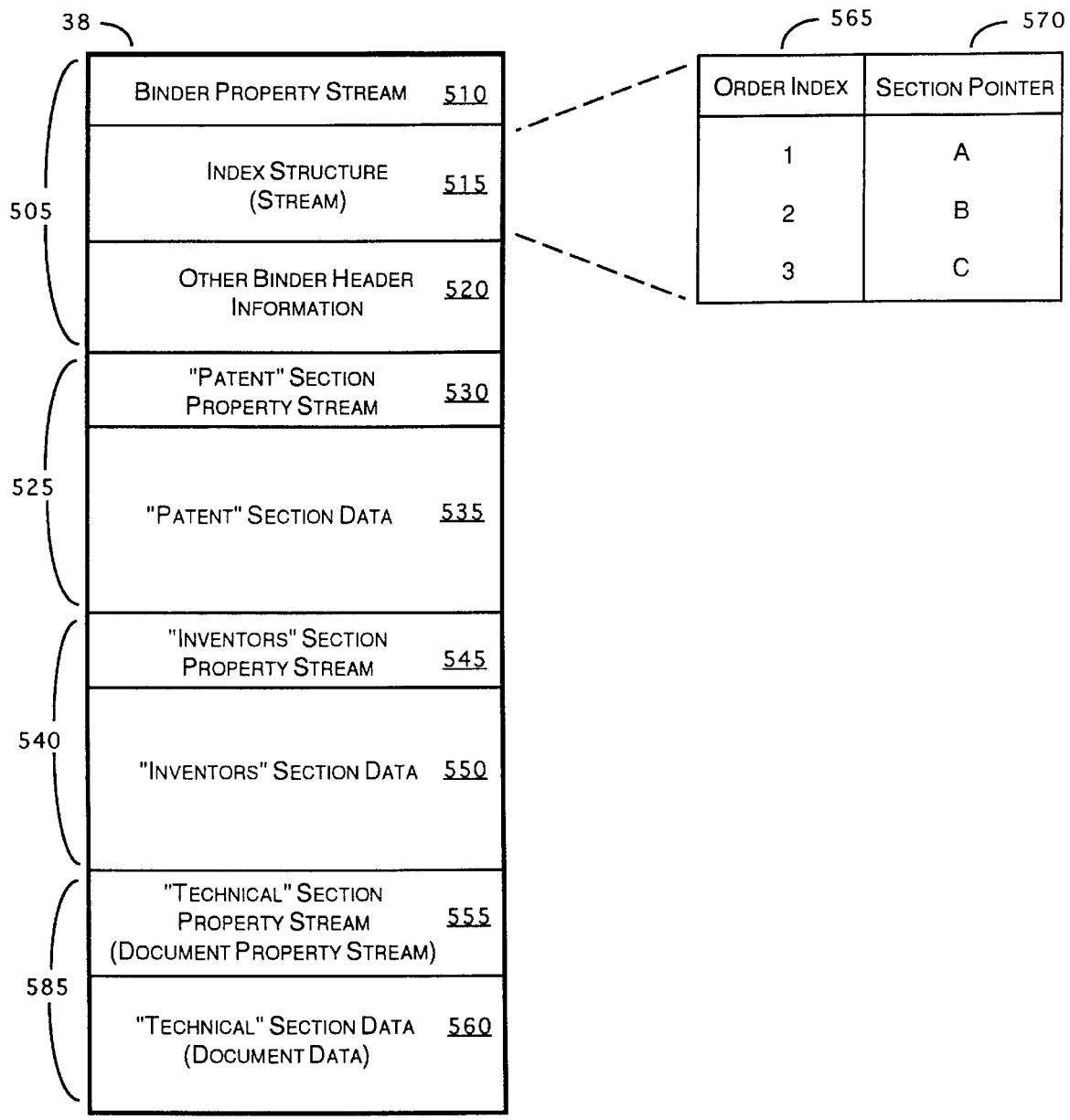
Figure 5C:
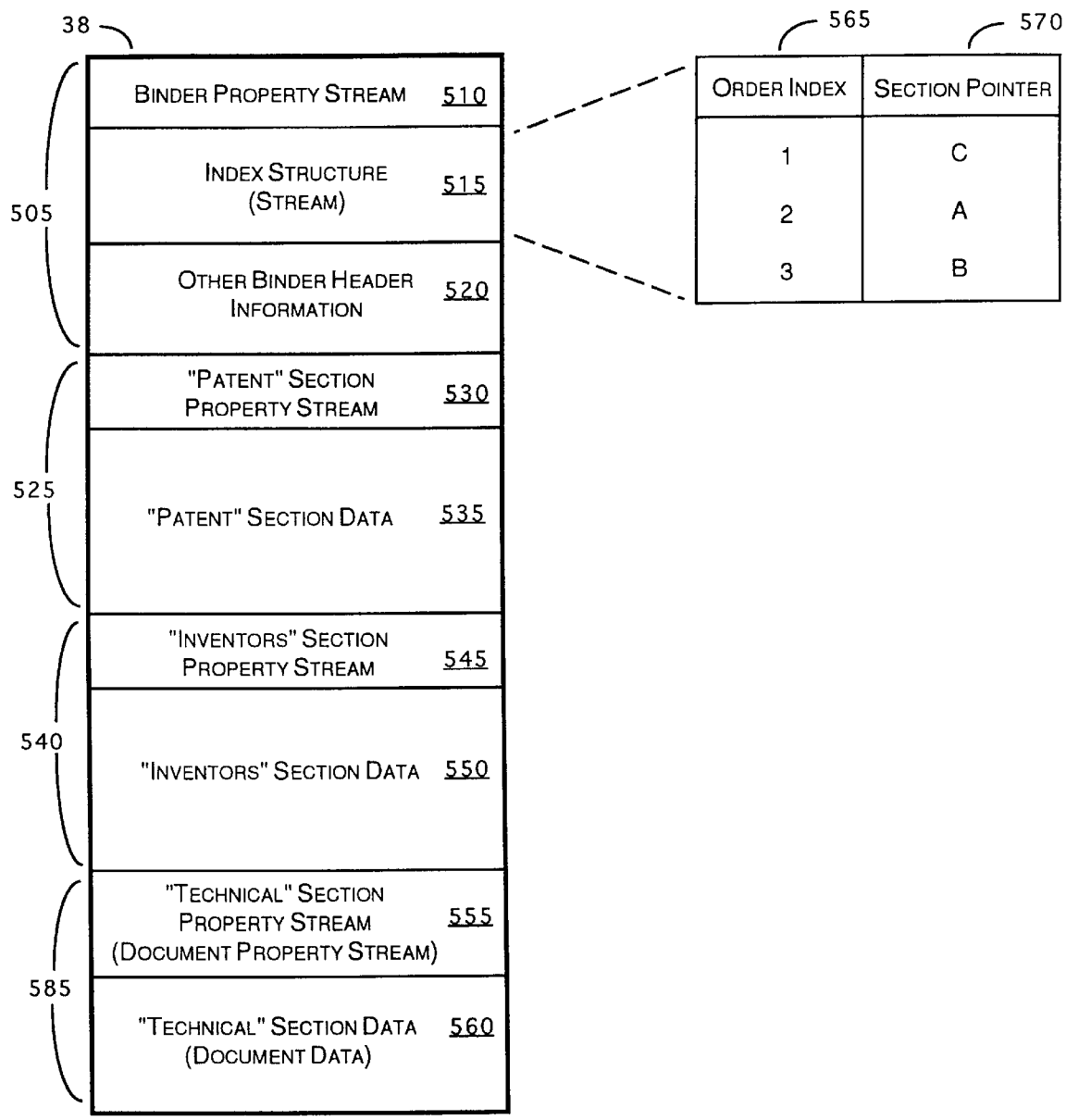

The details of the internal file structure of a binder file 38 are described in FIGS. 5A–5C. FIG. 5A is a diagram illustrating the structured storage aspects of the binder file 38 and an existing file 39a. FIG. 5B is a diagram illustrating the file structure of the binder file 38 for the addition of a new section is added to the binder document. FIG. 5C is a diagram illustrating the file structure of the binder file 38 when the order of sections is changed.

Referring now to FIG. 5A, one embodiment of the binder file 38 file structure stores each of the sections of the binder document within the binder file 38. In this embodiment, the binder file 38 is implemented as a single file system entity called a compound document adhering to the OLE 2.0 specifications for structured storage. As previously mentioned. OLE 2.0 structured storage specifications essentially describe storage-related APIs for stream objects and storage objects. A stream object is conceptually similar to a file. Streams are the basic file system component that contains all user-defined data. In contrast, a storage object is conceptually similar to a directory that contains the files but without user-defined data of its own. Each storage can contain multiple substorages or multiple streams. Thus, the binder file 38 is preferably implemented as a file system within a file. Those skilled in the art will be familiar with structured storage concepts from OLE 2.0.

Referring now to FIGS. 2 and 5A, a binder file 38 is shown maintaining a binder document currently having two sections. The binder file 38 contains a header 505 and two sections of the binder document, a "Patent" section 525 and an "Inventor" section 540. Each section is preferably implemented as a storage containing at least two distinct streams, a section data stream and a section property stream. For example, the "Patent" section 525 has a "Patent" section property stream 530 and a "Patent" section data stream 535. The data stream within a particular section contains the contents or data of that particular section of the binder document. For example, the "Patent" section data stream 535 contains text because the "Patent" section 525 was created by the word processing program module 37b.

A section property stream, such as the "Patent" section property stream 530, is a collection of information and statistics concerning an individual section of the binder document. This information preferably includes how many pages, paragraphs words, and bytes are in the section, specific keywords related to the section, and a graphical image that represents the section. As discussed with regard to FIG. 2, a graphical image 230a representing the "Patent" section 525 is stored in the "Patent" section property stream 530. Although the graphical image 230a is an icon in the current commercial embodiment, it also can be implemented by an image derived from the "Patent" section data stream 535 known as a thumbnail image (not shown). The thumbnail image for the "Patent" section 525 is preferably derived from either the first page of the "Patent" section data stream 535 or multiple pages of the "Patent" section data stream 535. A thumbnail image can be implemented by a metafile, which is a collection of information that forms an image. Metafiles store information in a sequence of graphic operations that is independent of the pixels used to display the image.

Each section, such as the "Patent" section 525 or the "Inventor" section 540, is advantageously maintained in a file format that is native to the application program module 37b–c that created the particular section. For example, the "Patent" section 525 is a text document (as shown in FIG. 2) and is maintained in a file format native to the word processing program module 37b. By maintaining a native file format, a section can be utilized by the corresponding application program module while the section is stored within the binder file 38 as well as after the section has been removed from the binder file 38.

The header 505 is maintained within the binder file 38 and includes a binder property stream 510 and an index structure 515. The binder property stream 510 used by the binder program module 37a to store information on properties related to all sections of the binder document. The properties are maintained by the binder program module 37a in the binder property stream 510, but some of the properties are derived from property streams of binder document sections. For example, Table 2 provides a list of the key properties preferably maintained in the binder property stream 510 by the binder program module 37a and how the properties are derived.

TABLE 2

| Property | How Derived |
|---|---|
| Title | typed text in a dialog box |
| Subject | typed text in a dialog box |
| Author | author's name who created |
| Keywords | typed text in a dialog box |
| Comments | typed text in a dialog box |
| Last Saved By | author'name who saved |
| Revision Number | set by binder program module 37a |
| Total Editing Time | set by binder program module 37a |
| Last Printed | set by binder program module 37a |
| Create Time/Date | set by binder program module 37a |
| Last Saved Time/Date | set by binder program module 37a |
| Number of Pages | tally from all sections |
| Number of Words | tally from all sections |
| Number of Characters | tally from all sections |
| Binder Doc Thumbnail Image | set by binder program module 37a (thumbnail of first section) |
| Name of Creating App. Program Module | set by binder program module 37a |
| Security | set by binder program module 37a |
| Category | typed text in a dialog box |
| Titles of Sections | from section property streams |
| Number of Bytes | tally from all sections |
| Number of Lines | tally from all sections |
| Number of Paragraphs | tally from all sections |
| Number of Slides | tally from all sections |
| Number of Note Pages | tally from all sections |
| Number of Hidden Slides | tally from all sections |
| Number of MM Clips | tally from all sections |
| Scale or Crop | set by binder program module 37a |
| Number of Elements in Content | set based on number of sections |

Within the header 505, the index structure 515 follows the binder property stream 510. The index structure 515 is a stream that maintains the order of binder document sections. The index structure 515 includes an order index 565 and a section pointer 570. The order index 565 maintains the user-definable order of binder document sections. An order index of "1" means the first or highest order. Corresponding to each order index, a section pointer 570 gives the memory location of the section for the corresponding order index 565. For example, if the "Patent" section 525 has been designated as the first section in the binder document then the section pointer 570 corresponding to the order index 565 of "1" would give the memory location of the "Patent" section 525.

The header 505 also can contain other binder header information 520, including the last position of the binder frame 205 (FIG. 2), the last active section in the viewport 225 (FIG. 2), whether the selection area 220 is visible or not, and the names of stored sections of the binder document. This information 520 is stored in the header 505 merely for convention and should not be construed as limiting to any aspect of the present invention.

In the alternative embodiment of the binder file 38 previously discussed with regards to FIG. 4B, the sections of the binder document are stored as separate files 39a–b rather than as sections stored within the binder file 38. Thus, the binder file 38 functions to maintain the header 505 as described above including, but not limited to, the binder property stream 510 and the index structure 515.

The separate document file 39a has an internal file structure that is similar to the "Patent" section 525 or the "Inventors" section 540 within the binder file 38. The document file 39a is in a native file format and includes a property stream 555 and a data stream 560, similar to the section property streams and section data streams discussed above. The document file 39a, however, is maintained in memory as a separate existing file rather than within the binder file 38. FIG. 5B illustrates the file structure of the binder file 38 that results from adding the document file 39a as a new section to the binder document.

Referring now to FIGS. 2 and 5B, the binder file 38 is shown after the document file 39a has been added to the binder document to become the new "Technical" section 585. In this configuration, the binder document now has three sections the "Patent" section 525, the "Inventor" section 540, and the "Technical" section 585. Once a new section is added to the binder document, the index structure 515 in the header 505 is updated by the binder program module 37a. A new order index 565 is added to the index structure 515 and a corresponding section pointer 570 is established giving the location in memory of the new section 585.

Additionally, the binder property stream 510 is updated. Those properties discussed above that are derived from each section of the binder document will change as a result of adding the new section, such as the total number of pages in the binder document and the graphical image for each section of the binder document.

The new "Technical" section 585 retains the native file format of the document file 39a. More particularly, the property stream 555 and the data stream 560 of both the new "Technical" section 585 and the document file 39a are the same. Furthermore, the new "Technical" section 585 need not be of the same file format as the other binder document sections. For example, the new "Technical" section 585 could have a bitmap image file format while the "Patent" section 525 has a text file format. This allows for more diverse electronic documents files 39a to be added as binder document sections and enhances the usefulness of the binder file 38. Exemplary methods of how to add new sections are discussed in more detail with regard to FIGS. 7 and 8.

FIG. 5C is an illustration of the file structure of a binder file 38 after the user has rearranged the order of sections in the binder document. One of the aspects of the present invention is the ability to maintain the order of binder document sections having different file formats and to easily rearrange this order. Referring now to FIGS. 2 and 5C, one way the order of sections can be changed is to select a graphical image 230c representing the desired section 585 from within the selection area 220 of the frame 205. Once selected, the user can drag the selected graphical image 230c within the selection area 200 and drop the graphical image 230c amongst the other graphic images 230a–b to establish a new order. If dropped at the top of the selection area 220, the desired section 585 becomes the first section of the binder document. Conversely, if the selected graphical image 230c is dropped at the bottom of the selection area 220, the desired section 585 becomes the last section of the binder document.

Figure 6A:
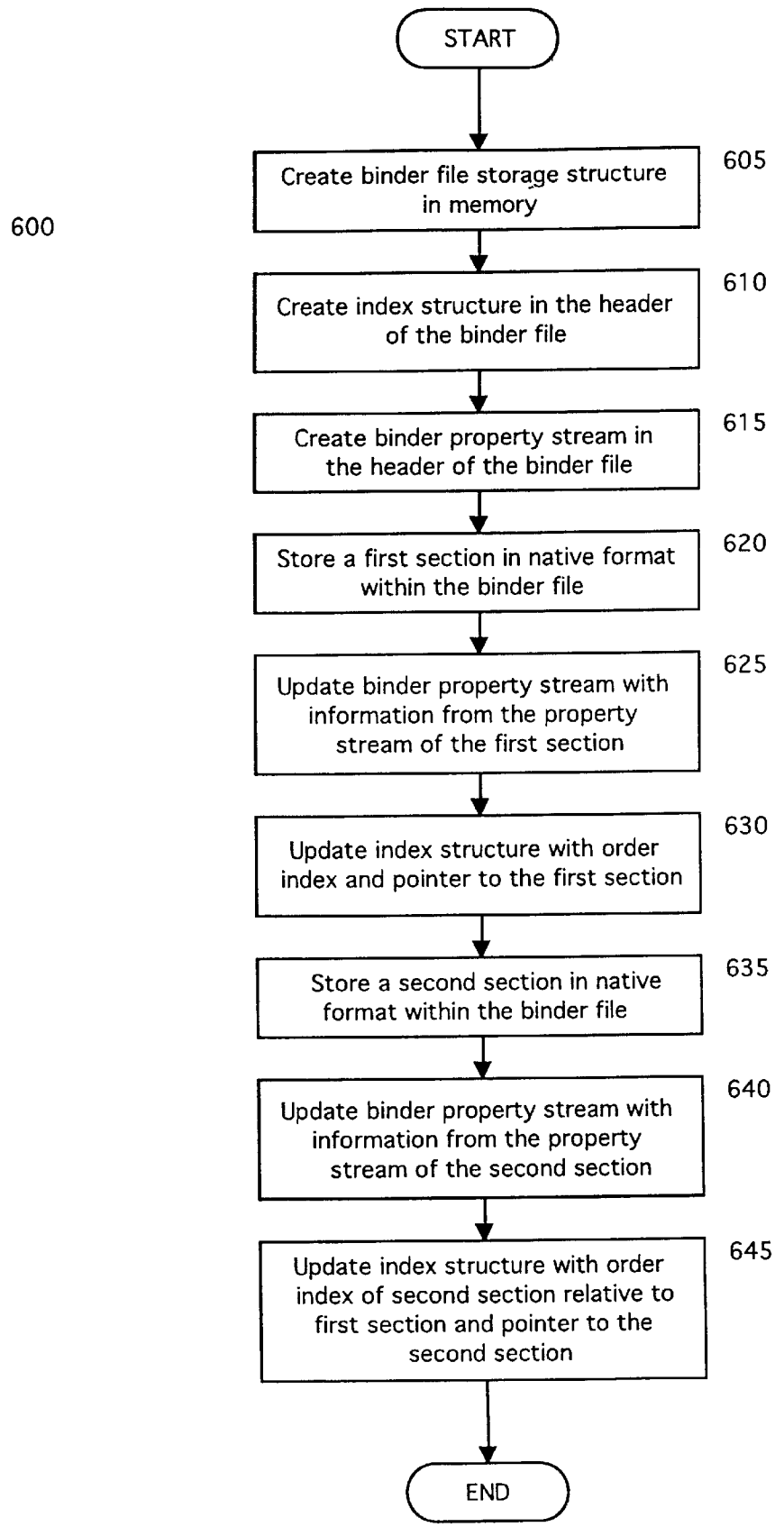
FIGS. 6A–6B comprise a flow diagram illustrating steps of the preferred method for storing ordered sections of different file formats and removing a section from a binder file.

FIG. 6A is a flow diagram illustrating the preferred method 500 of storing ordered binder document sections of differing file formats in a binder file 38. Referring now to FIGS. 5A and 6A, the binder file 38 storage structure is created in memory by the binder program module 37a at step 605. The binder file 38 includes a header 505 for storing information about the binder document. At step 610, an index structure 515 which includes an order index 565 and a section index 570, is created within the header 505. At step 615, a binder property stream 510 is created within the header 505. The binder property stream 510 contains information on properties related to the binder document as a whole.

At step 620, a first section, such as the "Patent" section 525, is stored within the binder file 38 in a file format native to the application program module that created the first section. At step 625, the binder property stream 510 is updated by the binder program module 37a with information from the property stream for the first section in response to storing the first section. In the disclosed embodiment, this includes updating the binder property stream 510 with thumbnail images of the section and statistical information such as the number of pages, paragraphs, words, and bytes in the first section.

Additionally, the order of new sections is stored in the binder file. At step 630, the index structure 515 is updated with an order index 565 for the first section and a memory location as a section pointer 570 corresponding to the first section.

At step 635, a second section, such as the "Inventor" section 540, is then stored within the binder file 38 in a file format native to the application program module that created the second section. While the first section and the second section are stored in their respective native file formats, the sections can have different file formats between the sections.

At step 640 the binder property stream 510 is updated by the binder program module 37a with information from the property stream for the second section in response to storing the second section.

At step 645, the index structure 515 is updated with an order index 565 and a memory location as a section pointer 570 corresponding to the second section. The relative order between sections of the binder document is maintained in the binder file 38 by updating the index structure 515 in this manner. Thus, sections of a binder document of differing file formats can be stored in a single file structure that maintains the order of sections and native file format of sections.

Figure 6B:
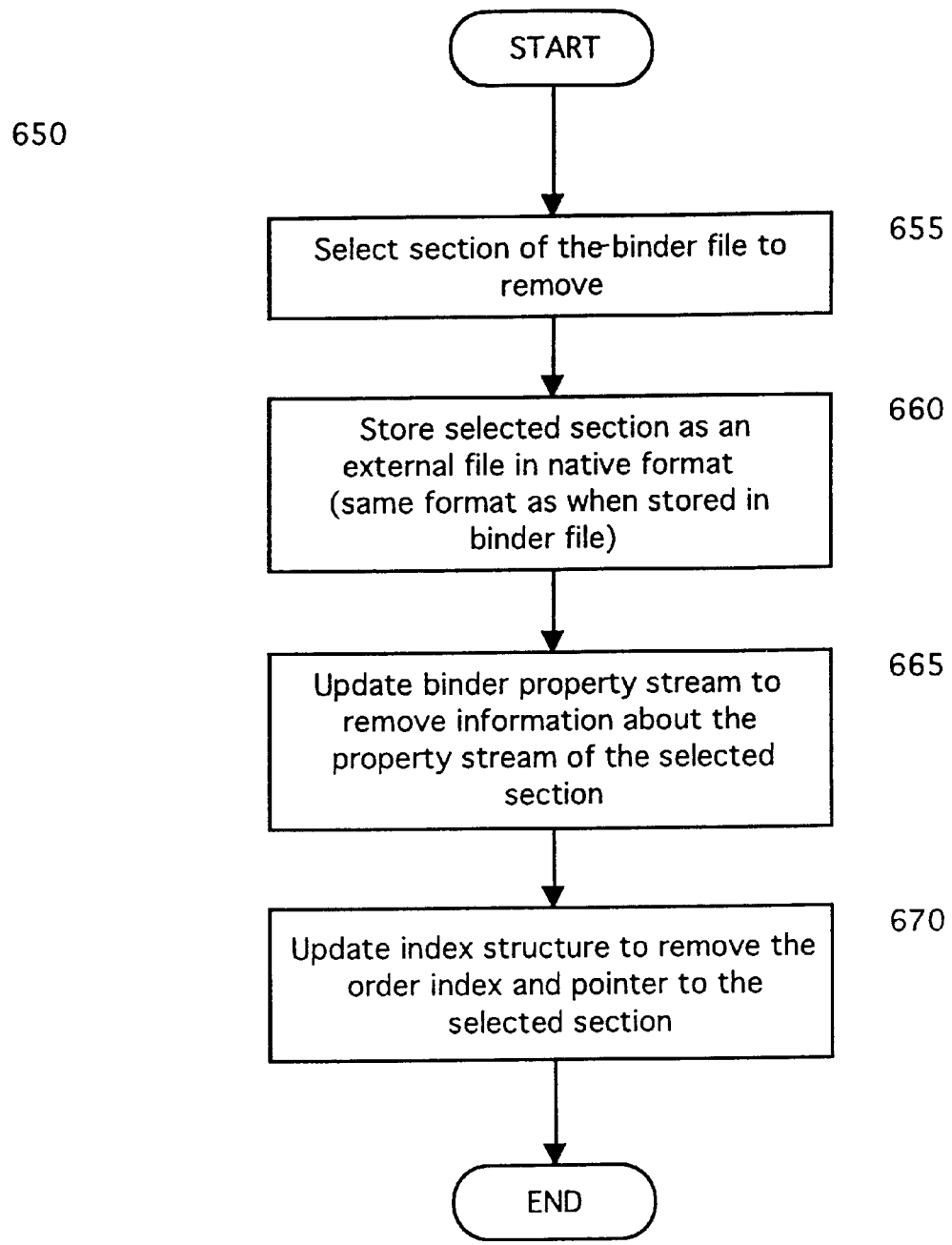

FIG. 6B is a flow diagram illustrating the preferred method 650 of removing one of the ordered binder document sections from a binder file 38. Removing a binder document section is also known as "exploding" a section from the binder document. Referring now to FIGS. 5A and 6B, a section of the binder document is selected to be removed or "exploded" from the binder document at step 655. At step 660, the selected section is stored as an document file 39a external to the binder file 38 using the native file format of the selected section.

Next, the properties of the binder document and the order of binder document sections are updated. At step 665, properties within the binder property stream 510 are updated to reflect the removal of the selected section. The graphical image of the selected section is removed and the properties derived from all sections, such as the total number of pages or bytes, are recalculated to update the binder property stream 510.

At step 670, the index structure 515 is updated to remove the order index value 575 and the section pointer 570 corresponding to the selected section. Thus, a section can be removed from the binder document and the file structure of the binder file 38 can be updated to reflect this change.

Drag & Drop Changes to a Binder File

FIGS. 7–9 are detailed flow diagrams describing the preferred methods of altering the binder file 38 to add a new section or to remove a section using drag and drop techniques previously mentioned with regard to FIG. 2. These aspects of the present invention are described in terms of changes to the binder program module 37a user interface (FIG. 2) and changes to the binder file 38 file structure (FIG. 5) when a new section is added or a section is removed.

As previously mentioned, there are two exemplary methods for adding a new binder document section using drag and drop techniques. FIG. 7 is a flow diagram illustrating the steps of the preferred method 700 for adding an entire existing document file 39a as a new section of a binder document. Referring now to FIGS. 2, 5A, 5B, and 7, a representation of an existing document file 39a is selected to become a new section 585 in the binder file 38 at step 705. The representation is preferably a graphical image, such as an icon, displayed on the computer monitor 31 (FIG. 1).

In step 710 and step 715, a conventional "drag and drop" operation is used to graphically manipulate the entire existing document file 39a. At step 710, the user moves or "drags" the representation of the existing document file 39a from its presently displayed location on the computer monitor 31 (FIG. 1) to the selection area 220 displayed by the binder program module 37a. Once moved over the selection area 220, the user releases or "drops" the representation of the existing document file 39a at step 715. Those skilled in the art will be familiar with the general concept of "dragging and dropping" representations of files (such as icons) in order to manipulate or operate on the file.

In response to dropping the representation on the selection area 220, the existing document file 39a is stored as a new section 585 (FIG. 5B) of the binder document in the binder file 38 at step 720. The new section 585 is stored using the native file format of the existing document file 39a. The new section 585 can also have a different file format than that of other sections 525, 540 of the binder document stored in the binder file 38.

After storing the existing document file 39a as a new binder document section 585 in the binder file 38, the status of the existing document file 39a is addressed at step 725. If steps 705 to 715 are desired to be a "copy" operation, then the existing document file 39a is left alone and step 725 proceeds to step 730. In this situation, the contents of the existing document file 39a essentially will have been copied to the binder file 38. Otherwise, steps 705 to 715 are considered a "move" operation and the existing document file 39a external to the binder file 38 is deleted at step 735 before continuing at step 730.

At step 730, the binder property stream 510 is updated by the binder program module 37a with information from the property stream 555 of the new section 585. Finally, at step 740, the index structure 515 of the binder file 38 is updated with an order index 565 and a memory location defined by a section pointer 570 corresponding to the new section 585. As previously mentioned, the relative order between binder document sections is maintained in the binder file 38 by updating the index structure 515. Thus, an existing document file 39a can be easily transformed into a new binder document section 585 using the preferred method 700 as described above.

The other exemplary method for adding a new binder document section using drag and drop techniques can be described with regards to FIG. 8. FIG. 8 is a flow diagram illustrating the steps of the preferred method 800 for adding only a portion of an existing document file 39a as a new section 585 of a binder document.

Referring now to FIGS. 2. 5B and 8, at step 805, the existing document file 39a is loaded by the application program module that created the document file 39a. At step 810, the contents of the existing document file 39a are displayed in a window or frame separate from the frame 205 displayed by the binder program module 37a. At step 815, a portion of the existing document file 39a is selected, preferably by conventionally highlighting the portion of the file 39a in response to operations conducted by a user with a mouse 29 (FIG. 1).

In step 820 and step 825, a conventional "drag and drop" operation is used to graphically manipulate the portion of the existing document file 39a. At step 820, the user moves or "drags" the selected portion of the existing document file 39a from its presently displayed location in the separate window to the selection area 220 within the frame 205 displayed by the binder program module 37a. The "moving" operation is preferably implemented by pressing a left button of the mouse 29 (FIG. 1) while the cursor is located over the selected portion of the file 39a and moving the mouse 29 (FIG. 1) while the left button is continuously depressed. Once the selected portion of the file 39a is moved over the selection area 220, the user releases or "drops" the selected portion of the existing document file 39a at step 825. Those skilled in the art will be familiar with general concept of "dragging and dropping" a portion of a file in order to manipulate the portion.

In response to releasing or "dropping" the selected portion on the selection area 220, the portion of the existing document file 39a is stored as a new section 585 (FIG. 5B) of the binder document in the binder file 38 at step 830. The new section 585 is stored using the native file format of the existing document file 39a, despite only being derived from a portion of the existing document file 38. Additionally, the new section 585 can also have a different file format than that of other sections 525, 540 of the binder document stored in the binder file 38.

At step 835, the binder property stream 510 is updated by the binder program module 37a with information from the property stream 555 of the new section 585. Finally, at step 840, the index structure 515 of the binder file 38 is updated with an order index 565 and a memory location as a section pointer 570 corresponding to the new section 585. As previously mentioned, the relative order between binder document sections is maintained in the binder file 38 by updating the index structure 515. Thus, a portion of an existing document file 39a can be easily transformed into a new binder document section 585 using the preferred method 800 as described above.

FIG. 9 is a flow diagram illustrating the preferred method 900 for removing a section from a binder file 38 using a drag and drop technique previously mentioned with regard to FIG. 2. Referring now to FIGS. 2, 5A, 5B, and 9, a binder document section 585 is selected to be removed or copied from the binder file 38 by selecting the graphical image 230c (an icon or a thumbnail image) corresponding to the selected section 585 from within the selection area 220 at step 905.

In step 910 and step 915, a conventional "drag and drop" operation is used to manipulate the section 585 represented by the graphical image 230c. At step 910, the user moves or "drags" the graphical image 230c from the selection area 220 to an area external to the frame 205. Once moved out of the frame 205, the user releases or "drops" the graphical image 230c at step 915. In response to dropping the graphical image 230c, the removed or copied section 585 is stored as a separate document file 39a external to the binder file 38 at step 920. The document file 39a is stored using the native file format of the removed section 585.

In the preferred embodiment of the present invention, the graphical image 230c must be dropped onto the "desktop"

background traditionally displayed on the monitor 31 (FIG. 1) or a graphical representation of any other file storage in order to store the removed section 585 as an external document file 39*a*. Those skilled in the art will be familiar with the "desktop" paradigm of graphical operating systems. However, if the graphical image 230*c* is dropped onto the selection area of a frame for another binder document, the removed section 585 will become another section in the other binder document. Furthermore, if the graphical image 230*c* is dropped onto the viewport of another frame displaying another binder document, one skilled in the art will appreciate that the removed section 585 will become an OLE 2.0 embedded object within the active section of the other binder document.

At step 922, if the selected section 585 is only to be copied, then the method ends. Otherwise, the selected section 585 is to be removed from the binder file 38 before proceeding to step 925.

At step 925, the binder property stream 510 is updated by the binder program module 37*a* to delete information from the property stream 555 of the removed section 585. Each of the previously listed binder properties that are derived from section properties are recalculated by the binder program module 37*a*. Finally, at step 930, the index structure 515 of the binder file 38 is updated to remove the order index 565 and the section pointer 570 corresponding to the removed section 585.

Although the preferred method 900 is described for removing a single section 585 from the binder file 38, the present invention contemplates removing multiple binder document sections through a single "drag and drop" operation where each section becomes a separate external document file 39*a*.

Thus, a binder document section 585 represented by a graphical image 230*c* in the selection area 220 can be easily removed from the binder file 38 and stored as an external document file 39*a* using the preferred method 900 as described above.

Processing Sections by Binder Program Module

In another aspect of the disclosed embodiment of the present invention, the binder program module 37*a* can sequentially dispatch application program modules 37*b*–*c* to perform data processing tasks in an uninterrupted, consecutive manner on each section of the binder file 38. These data processing tasks include printing, spell checking, and grammar checking each of the ordered sections of the binder document.

FIG. 10, consisting of FIGS. 10A and 10B, is a flow diagram illustrating steps of the preferred method 1000 for sequentially dispatching each application program module 37*b*–*c* related to each binder document section to consecutively print all sections of a binder file 38 in a single uninterrupted print job. Essentially the preferred printing method 1000 is a serial sequence because the binder program module 37*a* acts as a kernel that commands or dispatches each section to be printed by the application program module that created each section. This serial sequence is completed according to the order of binder document sections. The key advantage to this aspect is that the print job for all of the sections is processed and handled as if the printer were printing only a single document. In this manner, the pages of the binder document are consecutively printed without the possibility of printing interrupting and intervening print jobs while sections of the binder document are being printed. Thus, confusion by users of shared printers is advantageously reduced.

Referring now to FIGS. 2, 4A, 5A, and 10A, a user selects which binder document sections are desired to be printed at step 1005. In the commercial embodiment of the present invention, the user can either select to print a single section or all sections of a binder document.

At step 1010, the user also selects how to number the pages of all binder document sections. One option is to number the pages of each section as if each section is actually a separate document. In other words, the pages of each section will all begin with a fixed starting page number, preferably "1". The other option is to consecutively number the pages of all the sections. By consecutively numbering the pages of all the sections, the content of all the sections is intuitively presented to a reader as a single entity, rather than as disjointed components. Consecutive page numbering is especially useful when printing sections having different file formats.

At step 1015, the binder program module 37*a* reads the index structure 515 to determine the order of binder document sections and the total number of binder document sections in the binder file 38. The order of binder document sections is determined from the order index 565 and the section pointers 570.

At step 1020, a section variable, X, is initialized to "1". This section variable is an index that corresponds to the order index 565 of the binder file 38. Additionally, a starting page number variable, firstPage, is initialized to "1". At step 1025, if the binder document section having an order index 565 of the value of X (section X) is not selected for printing, then X is incremented at step 1030 before returning back to step 1025. Otherwise, section X has been selected for printing and the preferred method 1000 proceeds to step 1035.

At step 1035, the binder program module 37*a* dispatches the application program module that created section X to print this section by sending print data of section X to a temporary file and using page numbers that begin with the value of firstPage. In the disclosed embodiment, the binder file 38 is an object having a print method as part of its class definition. More particularly, this preferred print method is supported by an API called IPrint. The ability to dispatch another application program module to print out a section (DocObject) of a binder document is supported by the IPrint API. Basically, the IPrint API has a Print ( ) function used to command the corresponding application program module that created a section to print that section. The corresponding application program module then can use the full capability of its own internal printing features to generate print data, as opposed to generating print data merely by printing the contents of a metafile representation of the section. After each page of print data is generated, the application program module calls back to the calling program. Thus, at step 1035, the binder program module 37*a* dispatches the corresponding application program module that created section X, preferably by calling the IPrint::Print interface.

At step 1040, the underlying application program module receives the dispatched command from the binder program module 37*a* and sends print data for section X to the temporary file. By having the corresponding application program module control the actual creation of print data rather than the binder program module 37*a*, better control and quality of the printed section is attained. For example, the corresponding application program module can better control page breaks and other printing parameters that may be customized for that particular section.

After the corresponding application program module has sent a page of section X print data to the temporary file, the binder program module 37*a* sends the print data in the temporary file to a conventional print spooler to be printed on the printer 41 (FIG. 1) at step 1045. Additionally, the binder program module 37a resets a seek pointer of the temporary file. A seek pointer is a pointer to the memory location of a file. As bytes of data, such as section X print data, are stored into a file, the seek pointer is adjusted to indicate the memory location which was last written to. By resetting the seek pointer after taking data out of the temporary file, the size of the temporary file is kept to a minimum and wasteful use of memory resources, such as RAM 17 (FIG. 1), is avoided. If the seek pointer is not reset, the temporary file will continue to increase in size which may waste memory resources and is undesirable. Those skilled in the art will be familiar with seek pointers.

Referring now to FIGS. 2, 4A, 5A, 10A, and 10B, at step 1050, if the corresponding application program module is not finished printing section X (sending section X print data to the temporary file), then printing continues at step 1040. However if the corresponding application program module is finished printing section X, the corresponding program module reports the page number of the last page of section X (lastPage) to the binder program module 37a at step 1052 of FIG. 10B. At step 1055, if the user has not chosen consecutive page numbering back at step 1010 (FIG. 10A), then the starting page of the next printed section is reset to "1" by resetting the value of firstPage at step 1060 before proceeding to step 1070. However, if the user has chosen consecutive page numbering, then the starting page of the next printed section is set to one more than the last page from the last printed section (firstPage=lastPage+1) at step 1065 before proceeding to step 1070. In this manner, all pages from the printed binder document sections are preferably numbered consecutively.

At step 1070, if the section variable, X, is less than the total number of sections, then the section variable is incremented at step 1030 before proceeding to step 1025. Otherwise, all the sections of the binder document have been consecutively printed in order as a single uninterrupted print job.

Those skilled in the art will recognize that the preferred method 1000 described above with regard to FIGS. 10A and 10B can be performed without regard to how the sections are actually stored, i.e., whether the sections are stored within the binder file 38 or within separate document files 39a–b (FIG. 4B).

Another data processing task performed by the binder program module 37a is to sequentially check the spelling and grammar of text within each of the binder document sections. In order to accomplish this with differently formatted section, the binder program module 37a can sequentially dispatch the appropriate corresponding application program modules 37b–c to execute their own spell checking or grammar checking routines on binder document section created by the dispatched application program module 37b–c. In this way, the binder program module 37a functions to manage and control the spell checking or grammar checking process as if the binder document were a single electronic document.

FIG. 11 is a flow diagram illustrating steps of the preferred method 1100 for sequentially dispatching each application program module related to each section to check the spelling of the contents of each section of a binder file in a single data processing task. Although the preferred method 1100 illustrated in FIG. 11 is described in terms of checking the spelling of text, the method 1100 is essentially the same for checking the grammar of text.

Referring now to FIGS. 2, 4A, 5A, and 11, a user initiates checking the spelling of text from each binder document section at step 1105. This is typically performed by selecting Tools·Spelling from the drop-down frame menus 210. At step 1110, the binder program module 37a reads the index structure 515 to determine the order of binder document sections and the total number of binder document sections in the binder file 38. The order of binder document sections is determined from the order index 565 and the section pointers 570.

At step 1115, a section variable, X, is initialized to "1". This section variable is an index which corresponds to the order index 565 of the binder file 38. "Section X" refers to the section having the order index 565 of the current value of the section variable X.

At step 1120, the binder program module 37a dispatches the underlying application program module 37b–d that created section X to check the spelling of text within section X using the underlying application program module's own spell checking routine. It is advantageous to use the underlying application program module's own spell checking routine because typically that spell checking routine is optimized for specific file formats, and the sections in a binder document can have differing file formats. In the disclosed embodiment, the binder program module 37a makes a call to the IMSOCommandTarget API with an MSOCMDID_SPELL command to dispatch a corresponding program module to check the spelling of text within the appropriate section. It is contemplated that one skilled in the art could make this command dispatch the underlying program to check the grammar of section X.

At step 1125, the underlying application program module receives the dispatched command from the binder program module 37a and initiates an internal spell check on section X. Each of the individual sections are displayed in the viewport 225 in order during the internal spell check of section X. At step 1130, if the spell checking routine is finished with section X, then proceed to step 1135. Otherwise, step 1130 continues back to step 1125 to continue the spell checking process on section X.

At step 1135, if the user desires to terminate checking the spelling of text within each section of the binder document, then the preferred method 1100 ends. However, if the user desires to continue checking the spelling of binder document sections, then proceed to step 1140.

At step 1140, if the section variable, X, is less than the total number of sections, then the section variable, X, is incremented by one at step 1145 before proceeding to step 1120. Otherwise, all the sections of the binder document have been consecutively checked for spelling errors by their respective spell checking routines in a single uninterrupted data processing task.

Those skilled in the art will recognize that the preferred method 1100 for spell checking binder document sections described above with regard to FIG. 11 can be performed without regard to how the sections are actually stored, i.e., whether the sections are stored within the binder file 38 or within separate document files 39a–b (FIG. 4B).

SUMMARY OF THE DETAILED DESCRIPTION

From the foregoing description, it will be appreciated that the present invention provides a system for storing, viewing, editing, and processing ordered sections of a compound document where the sections can have differing file formats. In an embodiment of the present invention, ordered binder document sections having different file formats can be stored within a binder file 38 which maintains the order of the sections and the native file format of each section.

The ordered sections can be viewed and edited through a viewport 225 of a frame 205 displayed by a binder program module 37a in another aspect of the present invention. By selecting graphical images 230a–c displayed in a selection area 220 of the frame 205, the content of a binder document section can be viewed without viewing the content of other binder document sections. The graphical images 230a–c can be icons but are preferably images, called thumbnail images, derived from the content of sections.

In another aspect of the present invention, the binder program module 37a can dispatch the underlying application program modules 37b–d that created each binder document section to print, spell check, and grammar check the binder document sections as a single data processing task. In this manner, selected sections of a binder document can be printed as a single consecutively printed document without having other print jobs interrupting or intervening between printed sections of the binder document.

The foregoing system may be conveniently implemented in a program module that is based upon the flow charts in FIG. 3 and FIGS. 6–11. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of storing ordered sections having differing file formats in a single binder file 38, viewing and editing the contents of the sections in a viewport 225 displayed by a binder program module 37a, and processing (printing, spell checking, grammar checking) the contents of each section by the binder program module 37a. However, those skilled in the art will understand that the principles of the present invention apply to any tasks or processes that require storing, viewing, editing, or processing parts of a compound document whether the parts are stored in a single file or not.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for viewing and editing ordered sections of a binder document, comprising the computer-implemented steps of:

storing in memory a binder document comprising an index structure and a plurality of sections of the binder document, each of the sections created by a corresponding program module and having a format native thereto, the index structure comprising a plurality of pointers, each of the pointers pointing to one of the sections and a user-definable order of the pointers dictating the order of the sections within the binder document;

displaying a viewport for viewing and editing the contents of the sections;

selecting one of the sections to view in the viewport;

viewing the contents of the selected section in the viewport without viewing the contents of the unselected sections in the viewport; and editing the contents of the selected section directly in the viewport, without switching to or activating another viewport.

2. The method of claim 1, wherein the selecting step comprises selecting one of the sections using a single user-interface operation.

3. The method of claim 1, wherein the sections are stored within a single binder file as a compound document.

4. The method of claim 1, wherein each of the sections are stored in memory as separate existing files.

5. The method of claim 1 wherein the editing step comprises:

inputting a command for editing the contents of the selected section being viewed in the viewport;

dispatching the command to the corresponding program module related to the selected section;

without switching to or activating another viewport for the corresponding program module related to the selected section, processing the command with the corresponding program module so as to edit the contents of the selected section; and displaying the edited contents of the selected section in the viewport.

6. A computer-readable medium having stored thereon computer-executable instructions for performing the method steps of claim 5.

7. The method of claim 1 further comprising the step of, in the viewport, displaying a selection area containing graphical images in the user-definable order, each of the graphical images corresponding to one of the sections and wherein the selecting step comprises selecting one of the graphical images in the selection area.

8. The method of claim 7, wherein each of the graphical images is an icon.

9. The method of claim 7, wherein each of the graphical images is derived from the content of the selected section.

10. The method of claim 9, wherein each of the graphical images is derived from the first page of the selected section.

11. The method of claim 9, wherein each of the graphical images is derived from more than one page of the selected section.

12. The method of claim 7 further comprising the step of adding a new section by:

selecting a representation of an existing file;

moving the representation of the existing file over the selection area; and releasing the representation of the existing file over the selection area to cause the existing file to be stored as the new section.

13. The method of claim 12 further comprising the step of updating the user-definable order of the pointers in the index structure to include the new section.

14. The method of claim 12, wherein the step of selecting a representation of an existing file comprises displaying the contents of the existing file in a separate window and selecting a portion of the contents of the existing file as the representation of the existing file.

15. A computer-readable medium having stored thereon computer-executable instructions for performing the method steps of claim 12.

16. The method of claim 1, wherein the sections are stored within a single binder file as a compound document;

wherein the viewport comprises a selection area containing graphical images, each of the graphical images corresponding to one of the sections; and wherein the method further comprises the step of adding a new section by:
selecting a representation of an existing file;
moving the representation of the existing file over the selection area; and
releasing the representation of the existing file over the selection area to cause the existing file to be stored within the binder file as the new section while retaining the format of the existing file.

17. A computer-readable medium having stored thereon computer-executable instructions for performing the method steps of claim 16.

18. The method of claim 1, wherein the sections are stored within a single binder file as a compound document;
wherein the viewport comprises a selection area containing graphical images, each of the graphical images corresponding to one of the sections; and
wherein the method further comprises the step of removing one of the sections of the compound document by:
selecting one of the graphical images corresponding to one of the sections;
moving the selected graphical image external to the viewport; and
releasing the selected graphical image to cause the section represented by the graphical image to be removed from the binder file and stored as an external file while retaining the format of the removed section.

19. A computer-readable medium having stored thereon computer-executable instructions for performing the method steps of claim 1.

20. A method for editing a selected section of a binder document comprising an index structure and a plurality of sections of the binder document, each of the sections created by a corresponding program module and having a format native thereto, the index structure comprising a plurality of pointers, each of the pointers pointing to one of the sections, and a user-definable order of the pointers dictating the order of the sections within the binder document, the method comprising:
displaying the selected section in a viewport;
receiving a command for editing the contents of the selected section;
dispatching the command to the corresponding program module external to the viewport;
without switching to or activating another viewport for the corresponding program module, processing the command with the corresponding program module so as to edit the contents of the selected section; and
displaying the edited contents of the selected section in the viewport.

21. A system for viewing and editing ordered sections of a binder document, the sections comprising document objects created by corresponding program modules, the system comprising:
a memory for storing the binder document and the corresponding program modules, the binder document comprising an index structure comprising a plurality of pointers, each of the pointers pointing to one of the sections, a user-definable order of the pointers dictating the order of the sections within the binder document;
a display device for displaying a viewport for viewing and editing the contents of each of the sections;
an input device for inputting a command for selecting one of the sections;
an first application programming interface (API) for displaying the contents of the selected section in the viewport without displaying the contents of the unselected sections in the viewport; and
a second API for editing the contents of the selected section directly in the viewport, without switching to or activating another viewport.

22. The system of claim 21, wherein the first API is operable to:
create a view of the selected section, the view being a graphical representation of the contents of the selected section; and
display the view in the viewport.

23. The system of claim 21, wherein the second API is operable to:
accept a command for editing the contents of the selected section;
dispatch the command to the corresponding program module related to the selected section;
wherein the corresponding program module is responsible for processing the command so as to edit the contents of the selected section and utilizing the first API to display the edited contents of the selected section in the viewport.

* * * * *